(12) United States Patent
Sladek et al.

(10) Patent No.: US 6,622,016 B1
(45) Date of Patent: Sep. 16, 2003

(54) SYSTEM FOR CONTROLLED PROVISIONING OF TELECOMMUNICATIONS SERVICES

(75) Inventors: Thomas M. Sladek, Overland Park, KS (US); Baoquan Zhang, Overland Park, KS (US); Von K. McConnell, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 09/411,878

(22) Filed: Oct. 4, 1999

(51) Int. Cl.[7] ............................................. H04M 11/10
(52) U.S. Cl. ...................... 455/414; 455/414; 455/422; 455/432; 455/439; 379/201.01; 379/201.02; 379/201.07; 379/201.08
(58) Field of Search ................... 455/405–444; 379/201.01–201.05, 201.07, 201.08

(56) References Cited

U.S. PATENT DOCUMENTS

| | | | | |
|---|---|---|---|---|
| 5,533,106 A | * | 7/1996 | Blumhardt | .................. 379/130 |
| 5,610,969 A | | 3/1997 | McHenry et al. | |
| 5,610,972 A | | 3/1997 | Emery et al. | .......... 379/201.01 |
| 5,701,412 A | * | 12/1997 | Takeda et al. | .......... 395/200.01 |
| 5,758,281 A | | 5/1998 | Emery et al. | |
| 5,839,076 A | * | 11/1998 | Becher | ....................... 455/432 |
| 5,845,207 A | | 12/1998 | Amin et al. | |
| 5,920,820 A | | 7/1999 | Qureshi et al. | |
| 5,950,125 A | * | 9/1999 | Buhrmann et al. | .......... 455/422 |
| 6,014,377 A | * | 1/2000 | Gillespie | ..................... 370/310 |
| 6,044,264 A | * | 3/2000 | Huotari et al. | .............. 455/414 |
| 6,078,581 A | * | 6/2000 | Shtivelman et al. | ........ 370/352 |
| 6,094,479 A | * | 7/2000 | Lindeberg et al. | .......... 370/352 |
| 6,215,784 B1 | * | 4/2001 | Petras et al. | ................. 370/356 |
| 6,301,473 B1 | * | 10/2001 | Nguyen et al. | ........ 379/212.01 |
| 6,341,162 B1 | * | 1/2002 | Kelly et al. | ............ 379/207.02 |
| 6,373,930 B1 | * | 4/2002 | McConnell et al. | ... 379/114.28 |

OTHER PUBLICATIONS

SignalSoft Wireless Location Services—web site printout, Sep. 8, 1999.
CDMA Tiered Services Stage 2 Description, Nov. 18, 1998.
CDMA Tiered Services Stage 1 Description, Oct. 20, 1998.

* cited by examiner

Primary Examiner—William Trost
Assistant Examiner—Stephen M. D'Agosta
(74) Attorney, Agent, or Firm—Harley R. Ball; Steven J. Funk; Kevin D. Robb

(57) ABSTRACT

A method and system for controlled provisioning of a desired set of service logic for a subscriber of group of subscribers. In response to a designated stimulus, such as a time-event, a location-event or a threshold-event, a network entity modifies the subscriber profile maintained by a serving system, so as to include in the profile one or more desired parameters. One such modification may be the inclusion in the profile of a trigger that directs the serving system to query a designated network entity for call handling instructions. The designated network entity may then provide a special set of services for the subscriber or group. Further, a mechanism is provided to help ensure that once such a service overlay is imposed, it remains imposed if desired.

17 Claims, 5 Drawing Sheets

SYSTEM FOR CONTROLLED PROVISIONING OF TELECOMMUNICATIONS SERVICES

BACKGROUND OF THE INVENTION

1. Field of the Invention

The present invention relates to telecommunications services and more particularly to a system for controlling the provisioning of such services. In an exemplary embodiment, the invention provides for enhancing or otherwise modifying a set of services that are assigned to a given subscriber or subscribers. The invention may advantageously be used to temporarily add a service "overlay" for a subscriber, to provide a desired set of services for a given period of time or in response to various events.

2. Description of Related Art

Recent advances in telecommunications systems have enabled a wide array of special services to be made available to subscribers. Examples of such services include abbreviated dialing, which allows a subscriber to reach a party by dialing less than the entire telephone number of that party, call forwarding, in which calls directed to the subscriber may be forwarded to another line, terminating call screening, which allows the subscriber to specify certain times during which incoming calls are to be rejected, and originating call screening, in which calls to certain telephone numbers are barred. In general, special telecommunications services ("services") encompass those call features that do more than simply place or terminate telephone calls as dialed.

In the past, special telecommunications services were governed and provided for exclusively by the network switches or other entities that routed calls from one location to another. Such switches or other entities are usually at least part of a "serving system" that provides service for a plurality of subscribers. A typical switch would include a database of control information and call processing logic in addition to its basic switching capabilities. In response to a call placed to or from a subscriber, the switch would then apply services defined by this call processing logic. For example, the service logic may indicate that all unanswered calls to a particular subscriber should be redirected to a particular voice mail server.

This approach was viewed as unwieldy, however, because a telecommunications provider needed to update the software and databases on all of its many switches in order to update services or add new services throughout its telecommunications network. And to further complicate matters, the software needed to program switches from different vendors often differed greatly.

To overcome these limitations, many telecommunications networks have now adopted an advanced intelligent network ("AIN") approach. According to the AIN approach, much of the control information and call processing logic resides in a central network location or "central control point" instead of in the multitude of switches. Each switch is then programmed with a relatively minimal set of service logic that causes the switch to query the central control point at predefined "trigger points" during call processing, providing the central control point with parameters such as an identification of the calling and called parties, for example. When the central control point receives the query message, it may execute an appropriate set of service logic and/or consult appropriate databases in order to obtain information and instructions needed to provide a special service to the call.

In turn, the central control point may return a response message to the switch, instructing the switch how to handle the call.

In this way, the telecommunications switches can be quite generic but still able to carry out a variety of services. Further, changes made to service logic at the central control point can apply to a large number of switches, which makes changing or activating services and adding new services much easier and reduces the problem of differences in switches from different vendors.

An AIN network typically employs a standardized set of messages for communication between the switches (or other such entities) and the central control point, in order to allow for a variety of services. This standardized set of messages may be conveyed, for instance, over an out-of-band common channel interoffice signaling (CCIS) network, according to an established signaling protocol. The most well known such protocol is Signaling System #7 ("SS7"). According to SS7, predefined messages may be coded as Transaction Capabilities Application Part ("TCAP") messages and routed via a signaling transfer points ("STPs") between the switches and the central control point.

The particular message set may vary depending on the type of network. For instance, traditional landline AIN networks may operate according to standards are embodied in Bellcore's AIN Release 0.1 and AIN Release 0.2. Typical wireless networks, on the other hand, may operate according to other standards, such as Telecommunications Industry Association (TIA)/Electronics Industry Association (EIA) Interim Standard IS-41 ("Cellular Radiotelecommunications Intersystem Operations") and Interim Standard IS-771 ("Wireless Intelligent Network"). The entirety of each of these standards (as well as all revisions thereof) is hereby incorporated herein by reference.

In general, the trigger points and other control information about call processing for a given subscriber or group of subscribers can be defined and recorded in a database that is maintained for reference by the serving system during call processing. This set of parameters is considered a type of profile for the subscriber, or a subscriber profile. When the switch receives a request to complete a call to or from a subscriber, the switch may consult the subscriber's profile to determine whether it needs to query a central control point for call-handling instructions and/or whether it should carry out certain call processing logic itself.

By applying the AIN approach, the call processing information that is maintained locally for reference by the switch can be minimized, since most of the service logic and feature information for the subscriber can be maintained by the central control point instead. Further, changes made to service logic at the central control point can apply to a large number of switches, which makes changing or activating services and adding new services much easier and reduces the problem of differences in switches from different vendors.

A subscriber profile may define various types of trigger points and control information. At a basic level, for instance, a profile may define a so-called "all-digits trigger," which tells the serving system to query the central control point whenever the serving system receives a call origination attempt from the subscriber. Similarly, a profile may define a termination-attempt trigger, which tells the serving system to query the central control point whenever the serving system receives a request to connect a call to the subscriber. Such global triggers can be usefully employed to give the central control point extensive control over the services that will be provided to the subscriber. For instance, upon receipt of a TCAP query that is generated upon call origination, the central control point may determine that the calling subscriber has subscribed to a pre-paid call accounting service; in response, the central control point may initiate logic that will time the subscriber's call and decrement a pre-paid account balance accordingly.

The profile can define more specific triggers as well. For example, the profile may define a call origination trigger indicating that the serving system should further reference the subscriber profile to determine whether the subscriber is attempting to call a restricted destination, e.g., that the subscriber is blocked from calling a dialed number. Such a calling restriction may be desirable for group calling plans such as private branch exchange ("PBX") or Centrex service, or for parental control, for instance. If the number is blocked, standard local service logic may direct the serving system to respond with a recorded message or other appropriate action, or the trigger may indicate that the serving system should query the central control point for guidance.

As still another example, the profile may define a call termination trigger that indicates that if the called subscriber's line is busy or there is no answer, the call should be forwarded to a particular number that is recorded in subscriber's profile. Alternatively, the termination trigger may indicate that, in response to a busy or no answer condition, the switch should query the central control point for processing instructions. In that event, the central control point may apply a set of service logic for the subscriber and decide that the call should be forwarded to a specified number (e.g., to a specified voice mail system), or that the switch should operate as normal (e.g., provide a busy signal). The central control point may then instruct the switch accordingly.

The AIN concept is applicable in virtually any type of telecommunications network. Examples of such networks include, without limitation, landline networks and wireless networks (e.g., cellular radio transmission networks).

In a traditional AIN arrangement, each serving system typically comprises a switch referred to as a service switching point ("SSP"). The SSP is coupled via an STP network to a central control point, which is referred to as a service control point ("SCP"). The SSP maintains a subscriber profile database (e.g., a table, or more generally a data template or plurality of data templates), which defines trigger points for a given subscriber or group of subscribers. The SCP, in turn, maintains a subscriber profile database as well, indicating what service logic to provide for a particular subscriber or group of subscribers. When the SSP encounters a trigger point during call processing, it generates a TCAP query message defining the subscriber and other parameters, and it sends the query to the SCP. The SCP, in turn references its subscriber profile database, and identifies and executes the appropriate set of service logic. The SCP then generates and sends to the SSP a TCAP response message providing call handling instructions (e.g., a routing instruction, an instruction to play a message to the caller, or an instruction to simply connect the call to the dialed address.) Of course other arrangements are possible as well.

In traditional wireless networks, each serving system typically comprises a switch often referred to as a mobile switching center ("MSC"), as well as a subscriber profile database referred to as a visitor location register ("VLR"). A mobile subscriber (mobile station) communicates over an air interface with a base station in a cell, and the base station is interconnected to the MSC, in order to provide connectivity with other points. Each mobile subscriber is registered in a home system. The home system includes a home location register ("HLR") that defines the services and features authorized for use by the subscriber. When a mobile subscriber roams into a given serving system (even the subscriber's home system), the serving system engages in signaling communication with the HLR in the subscriber's home system (i) to notify the HLR where the subscriber is located and (ii) to obtain the subscriber's current profile. The serving system then stores the profile in its VLR for reference.

As in traditional landline systems, a wireless network can include a central control point that defines service logic to be executed for one or more subscribers. This central control point can take any form, including but not limited to an SCP and/or an HLR. When the serving system receives a call to or from a given subscriber, the serving system consults the subscriber's profile in the VLR and determines whether to query the central control point. A trigger point in the profile may instruct the serving system to send a signaling message to one or another central control point. The signaling message is typically defined by industry standards and encapsulated in a TCAP message, and the message provides the central control point with appropriate parameters such as an identification of the subscriber. Upon receipt of the signaling message, the central control point identifies and executes a set of service logic for the subscriber and then generates and sends to the serving system a response signaling message providing call handling instructions. In wireless, the AIN arrangement is also referred to as Wireless Intelligent Network ("WIN").

As an example, a serving system in a wireless network may include in the profile for a given mobile subscriber an all-digits trigger that causes the serving system to query a designated SCP in response to any digit sequence dialed by the subscriber. If the subscriber then dials an abbreviated dialing extension, the serving system would query the designated SCP for call handling instructions, the SCP may then translate the extension into a full routing number and return the full routing number to the serving system, and the serving system would route the call accordingly. As another example, a subscriber's HLR may include in the profile for the subscriber a particular termination trigger that directs the serving system to query a designated SCP for call handling instructions in response to a termination attempt to the subscriber. When the serving system receives a termination to the subscriber, the serving system may then query the HLR for instructions, the HLR may send the termination trigger to the serving system as an "advanced termination trigger" (i.e., one that does not normally reside in the serving system), and the serving system may respond to the trigger by querying the designated SCP for call handling instructions.

In addition, it is possible to arrange for the central control point in one system to communicate with the central control point in another system. For instance, one carrier's network may include an SCP (SCP-1) that provides call processing logic for calls placed to or from the network. However, another carrier's network may include an SCP (SCP-2) that contains service logic for a user who happens to be using the first carrier's network at the moment. (For instance, the second carrier may sell telecommunications services to a customer of the first carrier's). When SCP-1 receives a TCAP query from a serving system in the first's carrier's network, it may pass a signaling message to SCP-2 to find out what to do. SCP-2 may then identify and execute a set of service logic for the subscriber and then generate and return to SCP-1 a response signaling message providing call-handling instructions. SCP-1 would then send a response TCAP message to the serving system conveying the call-handling instructions, and the serving system would carry out the instructions. A mediated service logic system is disclosed, for instance, in a co-pending U.S. patent application entitled "Method and System for Providing Telecommunications Services Using Mediated Service Logic," filed on Oct. 1, 1999 by Von K. McConnell and assigned to the owner of the present invention, the entirety of which is hereby incorporated by reference.

With advances in telecommunications, the industry has recognized an increasing importance of providing new services for subscribers. In modern wireless communications systems, for instance, the industry has now developed a variety of location-based services for mobile subscribers. By way of example, wireless carriers have proposed offering a "closest-facility" service, in which a subscriber can dial a special number on a mobile station, select a type of facility such as "pizza restaurant" or "hotel" for instance, and the wireless carrier would then tell the subscriber where the nearest facility of that type is located. Such location-based services leverage the growing need to implement position-determination mechanisms in wireless networks, which arose initially to facilitate emergency response service (e.g., 9-1-1 services). Industry protocols defining position determination mechanisms include TIA Group TR-45 Recommendation PN-3890 ("Enhanced Wireless 9-1-1, Phase 2") and Recommendation PN-4288 ("Beyond Enhanced Wireless 911—Phase 2"), the entirety of which are incorporated herein by reference.

As another example, the industry has suggested the possibility of offering different services for a subscriber or group of subscribers depending on the geographic zone in which the subscriber is currently located. (See, e.g., "CDMA Tiered Services—Stage 1 Description," Oct. 20, 1998 ("User Zones may provide access to a unique set of services; may automatically activate or invoke or disable certain services or may modify the functionality of a particular service. These capabilities are anticipated to be provided by the network using Virtual Private Network (VPN) or Wireless Intelligent Network (WIN) techniques using User Zones as a trigger."))

The basic idea here is that a central control point may be programmed with alternative sets of service logic that the central control point may execute depending on where the subscriber is currently located. When a serving system queries the central control point for call processing instructions, the control point can employ a mobile positioning system to determine where the subscriber is currently located and then select an appropriate set of services based on that location. Thus, if the subscriber is in one zone, the control point may then execute a first set of service logic for the subscriber, and if the subscriber is in another zone, the control point may instead execute a second set of service logic for the subscriber. The end result is that the control point can effectively modify the services that are provided to the subscriber, depending on the subscriber's location.

This tiered services arrangement would likely require a serving system to query the central control point in response to every call attempt, in order to give the control point the opportunity to select and apply an appropriate set of service logic for the subscriber. In many instances, however, a subscriber may not change zones, or the subscriber may need only basic call processing services that could be readily handled by the serving system without the help of a central control point. Further, existing tiered services arrangements may not distinguish between subscribers within a given zone and would therefore require the serving system to query the control point in every instance of a call to or from a subscriber in the zone or might otherwise treat every subscriber in a given zone the same. Consequently, this arrangement can unnecessarily drain the resources of the central control point and the network.

SUMMARY OF THE INVENTION

The preset invention provides a method and system for controlled provisioning of telecommunications services. In particular, the invention offers a method and system to provide a subscriber with a service overlay in response to a designated stimulus. Providing a desired service overlay may involve modifying the subscriber's "base" set of services so as to add, remove and/or change a service for the subscriber. For instance, the overlay can involve making available to a subscriber station a service that is normally not available to the subscriber station, taking away a service that is normally available to the subscriber station, or in some way changing a service that is normally available to the subscriber station.

In accordance with a principal aspect of the invention, a service overlay for a subscriber is provided in response to a designated stimulus by effecting a modification of the subscriber's profile, so as to include as part of the profile one or more desired parameters that facilitate providing one or more desired services. One such parameter, for instance, may be a trigger and/or a trigger-address that causes the serving system to consult a designated network entity (for instance, an SCP, an HLR, an SN (e.g., with an interactive voice response unit ("IVRU"), or a PBX/CTI) for call processing instructions, or that causes the serving system to otherwise responsively communicate with such a designated network entity. Another desired parameter or set of parameters may be the service logic that the designated network entity employs for the subscriber, which can be arranged to provide one or more desired services for the subscriber. Thus, in response to a message from the serving system, the network entity can then apply a specified set of enhanced service logic and provide the serving system with call processing instructions or carry out any other designated action or service. Alternatively, the parameter can relate to other basic service functions that might be carried out by the serving system itself (without assistance from a central control point), such as call origination restrictions or password control for instance. Thus, one or more desired service parameters for the subscriber can be imposed, in the form of a parameter in the subscriber's profile and/or a parameter in service logic for the subscriber.

For instance, if the subscriber profile for a given mobile station includes an origination trigger that causes the serving system to query an HLR in response to any digit sequence dialed by the subscriber, the subscriber profile might be changed so as to instead include an all-digits trigger pointing to an SCP. The SCP may then apply a special set of service logic for the subscriber, including a service feature that the HLR would not normally have provided for the subscriber. As another example, if, on call termination to the mobile station, an HLR would normally send an advanced termination trigger to the serving system that would cause the serving system to query a designated SCP for call processing instructions, the subscriber profile as maintained by the HLR might be modified to instead provide the serving system with an advanced termination trigger that will cause the serving system to query a different central control point for call processing instructions. That different central control point may then execute a set of service logic to carry out a function that would normally not have been performed by the designated SCP.

In accordance with another principal aspect of the invention, a service overlay or other service modification that is provided for a subscriber can be temporary. For instance, a subscriber profile can be modified to add or activate a designated service that is normally not available or active for the subscriber. In turn, in response to a designated stimulus, such as the expiration of a specified time period, or the subscriber providing a predefined feature code, for instance, the profile can be modified again so as to put it back into its original state. Alternatively, other logic can be employed to stop providing the overlay service when desired.

The ability to temporarily provide a desired service set to a subscriber can be particularly beneficial for a business that wants to provide a subscriber with special services only while designated criteria are satisfied, such as (without limitation) for a particular period of time, or while the subscriber is in a particular location, or while a particular threshold is or is not met. For example, a hotel may want to offer an enhanced service overlay for a guest while the guest is staying at the hotel, so as to cause any answered calls at the guest's mobile telephone to be forwarded to the hotel's voice mail system. In accordance with the present invention, the hotel could do so at least in part by arranging to modify the subscriber profile for the mobile telephone upon check-in and to restore the subscriber profile to its original state upon check-out. The modification of the subscriber profile may add a termination trigger and/or modify an existing termination trigger, to cause the serving system to query a specified control point in the network for call handling instructions. The control point may in turn be programmed for the subscriber to direct the serving system to forward unanswered calls to the hotel's voice mail server.

In accordance with another principal aspect of the invention, a mechanism is provided to recognize or detect a designated stimulus and to responsively effect a modification of a subscriber profile so as to impose one or more desired service parameters for the subscriber. In an exemplary embodiment, a central control point (e.g., an SCP) is programmed with service logic to detect a stimulus and responsively effect a change of the subscriber profile. A service provider can provision an SCP with such service logic through various means. Alternatively, a business or other entity that wishes to provide a services overlay for a subscriber can itself provision the SCP with the necessary service logic, such as by sending service provisioning data to the SCP. Thus, the function of modifying a subscriber profile to provide a desired service overlay may itself be an enhanced service feature for the subscriber, which can be embodied in logic in the central control point or in another entity.

In accordance with yet another principal aspect of the invention, the SCP or other control point can effect a change of the subscriber's profile in various ways. For example, the SCP can send a service qualification message to the serving system, providing the serving system with an updated service profile. As another example, in a wireless system, the SCP can modify the subscriber's service profile in the HLR, which would cause the HLR to send an updated profile to the serving system. Subsequently, in response to another stimulus for instance, the SCP can effect another change of the subscriber's profile, restoring the original state of the profile.

In accordance with still another principal aspect of the invention, the SCP or other control point may be arranged to ensure that any desired modification of a subscriber profile remains in place when desired. In a wireless network, for instance, it is recognized that if the central control point modifies a subscriber's profile in the VLR to provide a desired service overlay, but the HLR then restores the subscriber's VLR profile to its unmodified state, then the desired service overlay can be lost. To resolve the problem, a mechanism can be provided to inform the central control point when a change is made to a VLR-maintained subscriber profile. With that knowledge, the central control point can then responsively ensure that the desired service overlay remains in place or is imposed again if necessary.

The present invention can be applied in various network arrangements where a subscriber profile is employed by a serving system, whether the profile is wholly or partially maintained in the serving system or elsewhere. Thus, for instance, the invention is applicable in a landline AIN arrangement where an SSP applies a subscriber profile and may thereby encounter a trigger that causes the SSP to query an SCP for guidance. As another example, the invention is applicable in a wireless AIN arrangement where an MSC applies a subscriber profile defined by a VLR (and/or maintained at least in part by an HLR (e.g., in the case of an advanced-termination trigger)) and may thereby encounter a trigger that causes the MSC to query an SCP or HLR for guidance. As still another example, the invention is applicable in a next generation packet-switched network, in which (for instance) a call agent or other serving system entity may apply a subscriber profile and responsively query an application server for guidance. Of course, other examples are possible as well.

These as well as other features and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
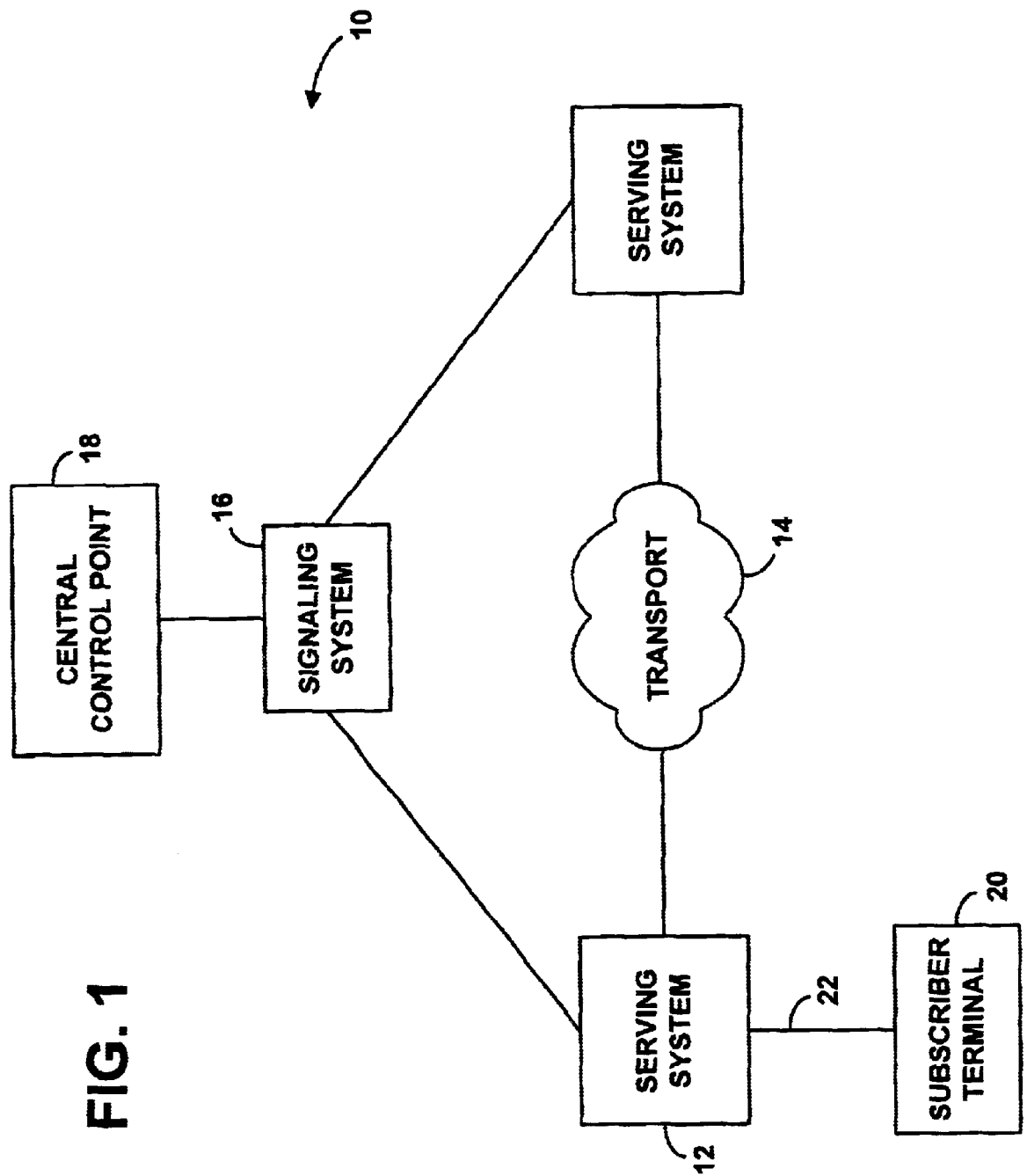
FIG. 1 is a simplified block diagram illustrating a telecommunications network comprising a serving system and a central control point, in which an exemplary embodiment of the present invention can be implemented.

Referring to the drawings, FIGS. 1 illustrates a simplified block diagram of a telecommunications network 10 in which an exemplary embodiment of the present invention can be employed. As shown in FIG. 1, network 10 includes a serving system 12 interconnected to (or part of) a transport network 14 and to a signaling system 16, and at least one central control point ("CCP") 18 interconnected to the signaling system 16 as well. Network 10 further includes a plurality of subscriber terminals, of which exemplary terminal 20 is shown. Terminal 20 may take any suitable form, such as (without limitation) a telephone, a computer, or a personal digital assistant ("PDA"). Terminal 20 may then be coupled to serving system 16 by an appropriate link 22, which may comprise wireline or wireless portions.

This and other arrangements described herein are shown for purposes of illustration only, and those skilled in the art will appreciate that other arrangements and other elements (e.g., machines, interfaces, functions, etc.) can be used instead, and some elements may be omitted altogether. Further, as in most telecommunications applications, those skilled in the art will appreciate that many of the elements described herein are functional entities that may be implemented as discrete components or in conjunction with other components, in any suitable combination and location. Still further, various functions described herein as being performed by one or more entities may be carried out by a processor executing an appropriate set of machine language instructions stored in memory. Provided with the present disclosure, those skilled in the art can readily prepare appropriate computer instructions to perform such functions.

As noted above, serving system 12 includes a set of stored logic that defines how to process calls involving one or more terminals, such as terminal 20. The stored logic may include a number of trigger points that cause the serving system to seek guidance from CCP 18 in response to various conditions. When serving system 12 encounters a trigger, the serving system may pause call processing and send a signaling message via signaling system 16 to CCP 18, carrying various parameters. For calls originating from terminal 20, the signaling message may, for instance, convey an identification of the terminal and the digit sequence dialed by the subscriber. For calls terminating to terminal 20, the signaling message may, for instance, convey an identification of the terminal and an indication of the calling party. Of course, these are only examples; the messages may convey these and/or other parameters.

As further noted, CCP 18 also includes a set of stored logic. When CCP 18 receives the signaling message from serving system 12, CCP 18 will execute its stored logic so as to parse the message, identify its parameters, and responsively carry out one or more functions. For example, in response to a call-origination signaling message, CCP 18 may determine that the subscriber dialed a toll-free number (e.g., an 800, 888 or 877 number). Conventionally, the CCP's logic may then cause the CCP to reference a database in order to translate the toll-free number into an actual routing number associated with the called party. The CCP may then generate and send to serving system 12 a response message instructing serving system 12 to route the call to the actual routing number. In turn, serving system 12 would then set up and connect the call over transport network 14 to that routing number.

Figure 2:
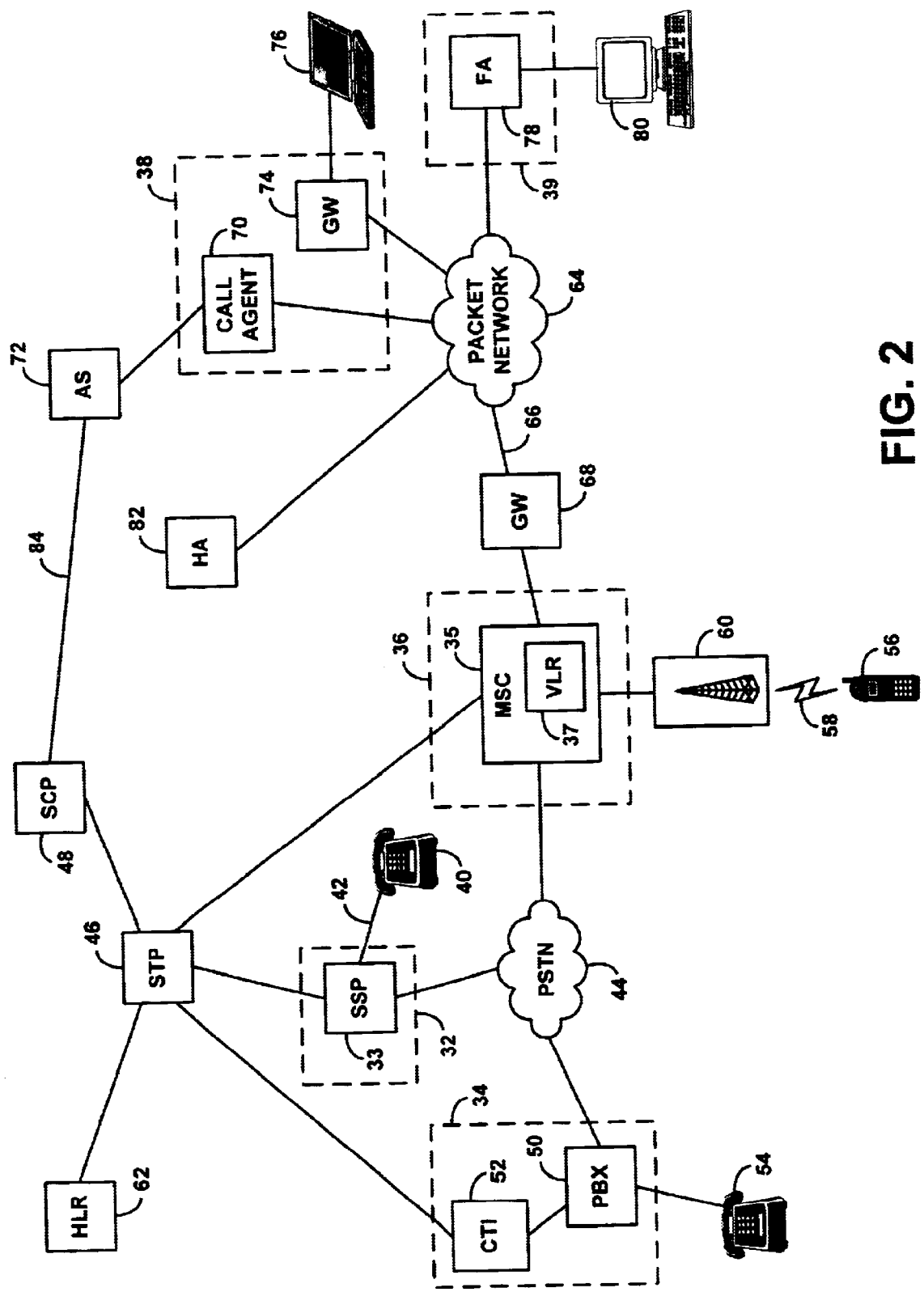
FIG. 2 is a block diagram illustrating a telecommunications network comprising a plurality of serving systems and central control points, in which an exemplary embodiment of the present invention can be implemented.

Network 10 is a generically representative of an AIN arrangement in which an exemplary embodiment of the present invention can be implemented. The particular arrangement, however, may take any of a variety of forms. To further illustrate arrangements in which the invention can be implemented, FIG. 2 depicts a network 30, which comprises at least five example serving systems, designated respectively by reference numerals 32, 34, 36, 38 and 39.

Example serving system 32 is principally a landline serving system, which typically comprises a landline switch (SSP) 33, such as a Nortel DMS-100 or DMS-250. Serving system 32 serves a plurality of landline subscriber stations, of which an exemplary station 40 is shown coupled by link 42 (typically a twisted copper pair of wires), and the SSP includes a set of logic indicating how to process calls involving those stations. Serving system 32 is coupled to a transport network such as the public switched telephone network ("PSTN") 44, and further to a signaling network represented by STP 46. In turn, signaling network is coupled to a central control point such as service control point (SCP) 48. SCP 48 includes a set of service logic to perform AIN functions for calls being served by system 32. When serving system encounters a predefined trigger point in its service logic, it pauses call processing and sends a signaling message via STP 46 to SCP 48. SCP 48 interprets the message and applies its own service logic, and SCP 48 then typically returns a response signaling message via STP 46 to serving system 32, instructing serving system 32 how to handle the call.

Example serving system 34 comprises a PBX server 50 coupled to a computer telephony interface ("CTI") 52. Such a serving system may serve a plurality of subscriber stations (e.g., corporate telephones or the like), an exemplary one of which is shown as station 54 for instance. The serving system (typically CTI 52) may maintain one or more subscriber profiles that define service parameters for the various stations being served. When the serving system receives a call to or from station 54, the CTI may then apply a set of logic based on the associated subscriber profile and, in doing so, may encounter a trigger point that causes the CTI to query SCP 48 for guidance. The CTI might then pause processing and send a signaling message via STP 46 to SCP 48, and the SCP might then apply its own service logic and send a response message to the CTI instructing system 34 how to handle the call.

Example serving system 36 is principally a wireless serving system, which typically comprises a mobile switching center (MSC) 35, such as a Telcordia MSC. Serving system 36 serves a plurality of wireless subscriber stations, of which an exemplary station 56 is shown coupled via an air interface 58 and base station 60. Serving system 36 further typically includes a visitor location register (VLR) 37, which maintains service logic (e.g., profiles) for wireless stations currently being served by system 36. Serving system 36 is also coupled via STP 46 to a home location register (HLR) 62, which, in this example, serves as the home register for wireless station 56. HLR 62 may perform AIN functions for calls being served by system 36. For instance, when serving system 36 receives a call for station 56 and station 56 is busy, serving system 36 may encounter a trigger and responsively pause processing and send a signaling message via STP 46 to HLR 62. HLR 62 would then interpret the message and apply its own service logic, and HLR 62 would then return a response signaling message via STP 46 to serving system 36, instructing serving system 36 how to handle the call. In addition, SCP 48 may perform AIN functions for serving system 36 in a similar fashion.

Traditional landline and wireless communications networks have been based principally on a circuit-switched arrangement, in which a switch (e.g., SSP or MSC) sets up and reserves an actual circuit with a remote switch, maintaining the circuit for the duration of the call. Recognizing the inherent inefficiency of this arrangement, the telecommunications industry has begun to embrace various "next generation networks" instead. Such networks typically employ packet-switched communication links (in addition to or instead of circuit-switched links). A gateway or "network access server" typically receives a media stream (e.g., voice, video, etc.) and/or a pure data stream and encodes and packetizes the stream into a sequence of packets. Each packet bears a header identifying its source and destination address as well as other information. The packets may be routed independently from node to node through a network and then re-ordered and reassembled by a gateway at the destination end for output to a receiving entity (e.g., person or machine). Alternatively, the packets may follow an established "virtual circuit," each traversing the same path from node to node and ultimately to the destination gateway.

For purposes of illustration, example serving system 36 is shown coupled to two transport networks, PSTN 44 and a packet-switched network 64 (such as the Internet, for instance).

Serving system 36 may be coupled to the packet network 64 by a link 66 that includes an "interworking function" (IWF) or gateway 68, which is arranged to convert between circuit-switched voice and/or data transmissions handled by system 36 and a packet sequence appropriate for transport over network 64. In this way, serving system 36 can provide connectivity for wireless subscriber station 56 over both the PSTN and the packet-switched network.

Next generation networks may employ AIN principles as well. For example, and without limitation, a network access server may communicate with a "call agent" node on the packet-switched network. The call agent node may serve as a gatekeeper, typically including connection manager, connection performer, and service management layers for routing calls through the packet network. (The call agent node may also be referred to as a "service manager," or "soft switch.") To take advantage of existing architecture, the service logic for providing AIN telecommunications services then typically resides on a separate "application server" also coupled with the packet-switched network or coupled directly with the call agent node. (The application server may itself be an SCP, for instance). The call agent and gateway may cooperatively be considered a type of "serving system" for a media stream and/or data stream being transmitted in a packet switched network, and the application server may be considered a type of central control point. As in traditional AIN arrangements, the serving system may then query the central control point, providing parameters such as the source and destination addresses, and the central control point can execute appropriate service logic and return call handling instructions. For instance, the application server may direct the serving system to redirect the packet stream to a "forwarding" address or other location.

Example serving system 38 comprises a call agent node 70 (e.g., a Telcordia Service Manager or a Lucent Softswitch), which is coupled to (or a node on) packet network 64. Call agent node 70 is in turn coupled to an application server ("AS") node 72, which may itself be an application residing on an SCP, HLR, CTI or similar entity. (For instance, as presently contemplated, AS 72 and SCP 48 may be provided as a common entity). Alternatively, both the call agent node and the application server node might be independent nodes on packet network 64. Serving system 38 may further comprise a gateway ("GW") or other such node (e.g., switch, hub, router, etc.), which may seek to route packets representing real-time media (e.g., voice, video, etc.) and/or data streams over the packet network. An example of such a gateway node is shown in FIG. 2 as gateway 74. Gateway 74 may provide subscriber stations with connectivity to the packet network. A representative station is shown as station 76.

Call agent node 70 may maintain a set of subscriber profile logic, including parameters such as trigger points, for subscribers such as station 76. When gateway 74 or another node seeks to route a packet sequence to or from station 76, the node may then communicate with call agent 70 (e.g., via a protocol such as MGCP, SGCP, SIP or H.323) to obtain call handling instructions. Call agent 70 may in turn encounter a trigger point in the subscriber profile and responsively communicate with AS 72 to obtain AIN service. In practice, call agent 70 may communicate with AS 72 according to an AIN 0.2-like protocol, over TCP/IP, or according to any other suitable protocol (e.g., SIP, H.323 or straight SS7). Thus, for instance, call agent 70 may generate and send to AS 72 a TCAP query message defining various parameters, and AS 72 may responsively employ an appropriate set of service logic and then generate and send to call agent 70 a TCAP response message. Call agent 70 may then instruct gateway 74 accordingly. In this arrangement, the CCP thus comprises AS 72. From another perspective, however, the CCP may be considered to include call agent 70, for instance, to the extent the call agent also provides AIN service logic to assist the gateway in handling call traffic.

Example serving system 39 also illustrates another type of next generation, packet-switched network arrangement. This arrangement, known as "Mobile IP," has emerged to serve nomadic users (terminals) who connect to a wireline (or possibly wireless) network. Mobile IP ("MIP") attempts to solve a problem that arises when a mobile terminal with a permanent network address (e.g., internet protocol (IP) address) in one sub-network changes physical locations, such as moving to another sub-network. The arrangement works somewhat like a postal forwarding system. Each terminal is assigned a permanent address that is maintained by a "home agent," which might be a gateway or other entity in the terminal's home sub-network. When the terminal travels to another sub-network, the home agent will receive packets destined for the terminal. The home agent will then add a new header to the packets (or modify their existing headers) and forward them to a "foreign agent," which is a node serving the foreign sub-network. The foreign agent then de-capsulates the packets and forwards them to the mobile terminal.

As presently contemplated, AIN principles can be applied in a Mobile IP arrangement as well. In particular, the sub-network in which the mobile terminal is currently located could be considered a serving system, and the terminal's home sub-network could be considered the terminal's home system. Thus, as presently contemplated, a subscriber's home agent can be programmed to serve as a central control point, somewhat like an HLR or SCP in a wireless network, and the foreign agent can be programmed to employ subscriber profiles for visiting terminals, somewhat like the combined MSC/VLR entity in a wireless network.

In FIG. 2, example serving system 39 is thus shown to comprise a MIP foreign agent ("FA") 78. Typically, FA 78 might be a gateway node on packet network 64, arranged to convert between circuit-switched data and/or voice on one side and packet traffic appropriate for packet network 64 on the other side. However, FA 78 can take other forms. Then somewhat like serving system 36, system 39 would act as a serving system for nomadic stations (whether landline or wireless) that are visiting a given sub-network with which FA 78 is associated. One such station is depicted by way of example as station 80. In turn, packet network 64 is also coupled to (or includes) a home agent ("HA") 82, which, in this example, serves as the home agent for station 80. As such, HA 82 may play the part of an AIN central control point, maintaining a set of service logic and providing call handling instructions to serving system 39. The functionality of HA 82 may reside on an SCP or HLR, for instance.

As thus illustrated, each serving system in network 30 is typically served by one or more particular CCPs, which is usually (but not necessarily) owned and operated by the same carrier that operates the serving system. A CCP in one carrier's system, however, can be arranged to provide AIN functionality to serve subscribers operating in another carrier's system. (Alternatively, one CCP in a given system can be arranged to provide AIN functionality for another CCP in the same system). One way to accomplish this is to have the service logic in one carrier's CCP communicate with the service logic in another carrier's CCP, so that the other carrier's CCP can provide instructions on how to handle a call in the first carrier's serving system.

As shown in FIG. 2, for instance, SCP 48 might be coupled by a communications link 84 (which could be a packet switched link, for instance) with AS 68. That way, when a serving system on packet network 58 seeks guidance from AS 68, AS 68 can in turn seek guidance from SCP 46. In response to instructions from SCP 46, AS 68 can then pass a signaling message back to the querying serving system, instructing the system how to handle the call. Advantageously, then, a user engaging in communications over a next generation packet switched network can benefit from service logic maintained in another network, such as the user's home telephone network. For instance, the services and features that are applied to the user's home telephone can be applied as well to communications over the next generation network. The same thing can be said for other combinations of networks as well, such as mobile and landline, for instance.

Figure 3:
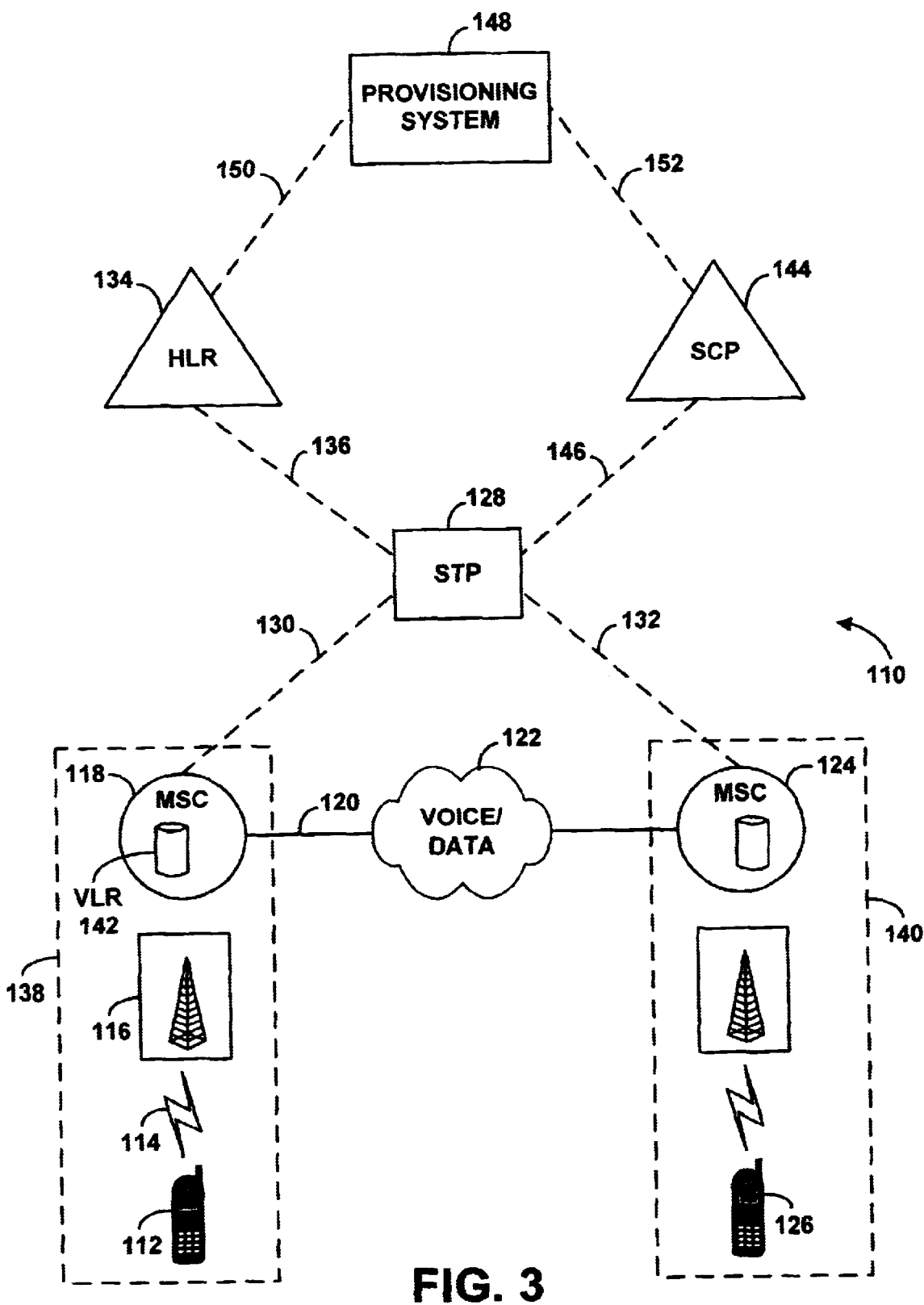
FIG. 3 is a block diagram illustrating wireless network arrangement in which an exemplary embodiment of the present invention can be implemented.

Turning now to FIG. 3, there is shown more specifically a wireless network 110 in which an exemplary embodiment of the present invention can be implemented. As shown, network 110 includes a mobile station ("MS") 112, which communicates over an air interface 114 (e.g., a $U_m$ interface as defined by IS-95) with a base station controller ("BSC") 116. An intermediate base station (not shown) may be interposed between MS 112 and BSC 116. MS 112 may be any mobile station such as a cellular telephone, a PDA, a computer, a fax machine or other such device. In the example illustrated, MS 112 is a Code Division Multiple Access ("CDMA") telephone supporting IS-95, IS-41, IS-771 and GSM Intersystem Operation Standards ("IOS") and may be identified by a unique tag such as a mobile station ID ("MSID"), electronic serial number ("ESN"), mobile directory number ("MDN"), or international mobile service ID ("IMSI") for instance. BSC 116 may in turn be any base station controller arranged to communicate with MS 112, such as the Autoplex controller manufactured by Lucent Technologies.

BSC 116 is in turn coupled by a standard IS-634 interface with a MSC 118, which serves to connect calls between various points in network 110. As shown, for instance, MSC 118 is interconnected by a voice/data link 120 to a network 122, which provides a path through which MSC 118 may connect calls with a remote MSC 124 and in turn with a remote station 126. Network 122 may be the PSTN or a packet-switched network such as the Internet (carrying voice over IP, for instance) or any other network or direct connection. Of course MSC 118 may provide connectivity to other nodes in network 110 as well.

Exemplary network 110 includes a signaling subsystem, which may be a packet-switched SS7 signaling system for instance. At the core of this signaling system is an STP backbone network 128, which may consist of one or more STPs and associated signaling paths. STP network 128 routes signaling messages, such as IS-41 Mobile Application Part ("MAP") and ISUP call-connection messages, between various entities in network 110. In the arrangement shown, for instance, MSC 118 is coupled to the STP network by a signaling path 130. Similarly, remote MSC 124 is further coupled to STP network 128 by signaling path 132, thereby facilitating signaling communications between MSC 118 and MSC 124.

Network 110 further includes an HLR 134, which will be assumed to be the HLR for the home system of mobile station (i.e., subscriber) 112. HLR 134 could be provided on or in conjunction with an SCP or other platform for instance. Network 110 would normally include other HLRs associated with other home systems. However, the other HLRs are not shown, for clarity. HLR 134 is coupled to the STP network 128 by a signaling link 136, thereby facilitating signaling communication between HLR 134 and MSC 118 for instance.

Shown in FIG. 3 are two exemplary serving systems, serving system 138 and serving system 140. Serving system 138, for instance, comprises MSC 118 and BSC 116. In reality, serving system 138 would probably include many MSCs, but only one is shown for clarity. In addition, serving system 138 includes a VLR 142, which maintains temporary records for subscribers in the serving zone. VLR 142 is usually part of MSC 118, but the two can instead be separate physical entities.

When a subscriber is located in a given serving system, the serving system needs to know what services the subscriber is authorized to use and who to bill for providing those services to the subscriber. To obtain this information, the subscriber's HLR will provide the serving system with a current service profile for the subscriber, which the serving system will store in its VLR for reference. The process of providing the subscriber's service profile to the serving system is part of a process called "service qualification." Service qualification can occur in various instances, including, for instance:

When a mobile station is initially detected in a serving system;

When previously obtained service qualification information for a mobile station indicates a limited duration, and the time period expires; and Whenever the subscriber's service qualification information at the HLR changes as a result of administrative or subscriber action.

By convention, service qualification may be requested by the serving system or may be autonomously initiated by the subscriber's HLR. In either case, the HLR will typically provide the serving system with a service qualification message that defines the subscriber's service profile as well as other parameters such as a time period after which the subscriber must be requalified.

As an example, when mobile station 112 is first turned on (powered up) in or enters serving system 138 (even if the serving system is the subscriber's home system), equipment in the serving system detects the mobile station (identified by its MSID and/or ESN, for instance). The serving system then determines the network address (e.g., SS7 "point code") of the subscriber's HLR 134, typically by reference to a local table (based on inter-system roaming agreements or other information). Provided with the address of HLR 134, the serving system then sends a registration notification (REGNOT) message, via link 130, STP 128 and link 136, to HLR 134, typically as payload in a TCAP message. Alternatively, if applicable, the serving system may simply send a REGNOT message to an HLR associated with the serving system, and the HLR can identify the subscriber's HLR and forward the REGNOT to that HLR.

The REGNOT message serves to notify the HLR of the subscriber's location, which is important information for the HLR, to allow the HLR to properly direct calls and other services (e.g., messages) to the subscriber. (For instance, when a serving system receives a call for a subscriber, if the serving system does not have a record for the subscriber in its VLR or if otherwise desired, the serving system might be arranged to send a location request (LOCREQ) message to the subscriber's HLR, and the HLR may then respond by providing the location of the subscriber. In turn, the serving system may set up and connect the call to the designated location.) In addition, the REGNOT message serves as a request for service qualification.

In response to a REGNOT message, the subscriber's HLR returns a regnot response message to the serving system. (Note that, by convention, initial messages or "invokes" (e.g., "REGNOT") are set forth in all caps, while response messages (e.g., "regnot") are set forth in lowercase). According to the IS-41/IS-771 standards, one of the parameters of the regnot response is the subscriber profile (or, more accurately, a profile "macro" that references a list of applicable parameters) for subscriber 112. Upon receipt of this response, serving system 138 stores the subscriber profile in VLR 142 for later reference.

As another example, upon the expiration of a previous service qualification or for any other specified reason, the serving system may ask the HLR to update the local service qualification for a subscriber. According to IS-41/IS-771, the serving system can do this by sending a QualificationRequest (QUALREQ) message to the HLR. The HLR would then respond to a QUALREQ message with a qualreq response message, that, like the regnot message, provides the serving system with information including the subscriber profile. And, again, the serving system would store the updated profile in its VLR.

As yet another example, whenever the subscriber's service profile at the HLR changes in some way that may impact the profile recorded in the serving system, IS-41/IS-771 recommends that the HLR be programmed to send an updated profile to the serving system. The HLR can do this by sending a QualificationDirective (QUALDIR) message to the serving system. Like the regnot and qualreq response messages, the QUALDIR message provides the serving system with information including the subscriber profile, which the serving system will record in its VLR.

An HLR-maintained subscriber profile may change for various reasons. For instance, an administrative action could cause a new feature to be added to the subscriber's profile or an existing subscriber feature to be activated. As another example, when a text message or voice mail message is sent to a subscriber, the subscriber's HLR is notified, which may cause a flag to be set in the profile at the HLR, effectively changing the profile. As yet another example, the subscriber may activate or de-activate a particular service (such as call forwarding, for instance) by sending (e.g., dialing) a feature code; in that case, the serving system would forward the feature code to the HLR, and the HLR would update the subscriber's profile to reflect the service activation.

According to IS-41/IS-771, the subscriber profile that the HLR provides to a serving system can optionally convey a variety of useful control information such as trigger points and other parameters to assist in call processing. As examples, and without limitation, the profile can include the following parameters:

"CallingFeaturesIndicator", which defines authorization and activity states for the subscriber's features;

"DMH_BillingDigits", which specifies the telephony billing number used for calls with special billing arrangements, to identify the party to be billed, such as third party calling for instance.

"MessageWaitingNotificationCount", which indicates the number and type of messages currently stored in the subscriber's mailbox(es);

"DirectoryNumber", which indicates the directory number (e.g., telephone number) of the mobile station, which may be different than its MIN;

"OriginationIndication", which specifies the types of calls that the subscriber is allowed to make (e.g., no outgoing calls allowed, or local calls only, etc.);

"OriginationTriggers", which defines the origination trigger points that are currently active for the subscriber (e.g., launch an OriginationRequest query in response to any call (i.e., all-digits origination trigger), or in response to any local call, any call placed to a particular number, any long distance call, or any call involving dialed digits beginning with a character such as "*" or "#", for instance);

"SMS_OriginationRestrictions" and "SMS_TerminationRestrictions", which define the type of short text messages that the subscriber is allowed to send or receive;

"SPINIPIN" and "SPINITriggers", which indicate a personal identification number ("PIN") and call processing trigger points at which the serving system must require input of the PIN before allowing call originations from the mobile station; and "TerminationTriggers", which defines the termination trigger points that are currently active for the subscriber (e.g., launch a RedirectionRequest query in response to a busy, no answer or not reachable condition, for instance.)

In addition, according to IS-771 for example, the subscriber profile can include a "TriggerAddressList" parameter, which is used to provide the serving system with lists of triggers and, for each list, an associated address (e.g., point code) of a network entity that provides the service control function for the triggers in the list. The triggers are referred to in IS-771 parlance as "WIN_Triggers." The idea here is that the profile may specify that the serving system should query any designated central control point in the network (e.g., an HLR, an SCP, an intelligent peripheral ("IP"), or a service node ("SN")) for guidance at a predefined trigger point during call processing.

Accordingly, to facilitate additional WIN services, network 110 may further include a central control point, which is depicted for purposes of example as SCP 144. SCP 144, which is coupled by a signaling path 146 with the STP network 128, may be a Telcordia SCP (e.g., an integrated SCP or "ISCP"). SCP 144 can thus serve conventional AIN features such as providing routing instructions to MSC 118. SCP 144 is typically owned and operated by a local or long distance carrier. Further, although SCP 144 is shown separate from HLR 134, it is possible that the two may be one combined entity, such as one computer system operating two separate functional processes. In the exemplary embodiment, messages can be passed between such separate processes, even if only as arguments of function calls.

As additionally illustrated in FIG. 3, network 110 also includes a provisioning system 148. Provisioning system 148 is shown coupled by a signaling link 150 with HLR 134 and by a signaling link 152 to SCP 144. Provisioning system 148 may operate to load service profile information for various subscribers or groups of subscribers into HLR 134 and to load enhanced service logic for various subscribers or groups of subscribers into SCP 144. This logic may be the logic that causes the profile modification in response to a designated stimulus and/or it could be associated logic to provide one or more services for the subscriber. In addition, provisioning system 148 may allow authorized individuals or entities to view the current parameters and settings recorded in the HLR and SCP. Although FIG. 3 shows provisioning system 148 as a single entity serving both HLR 134 and SCP 144, separate provisioning systems and one or more entities may be provided instead.

In an exemplary embodiment, the mechanism for provisioning a CCP (e.g., an SCP or HLR, for instance) with such logic can take any of a variety of forms. For example, the CCP may be coupled to or programmed with a service management system ("SMS") and/or a user interface called a service creation environment ("SCE"), which allows for the provision and modification of the subscriber service logic maintained by the CCP. A customer care agent for a service provider may then interact with the SCE at a computer terminal, to access, create and modify the service logic and other control information maintained by the CCP for a given subscriber or group of subscribers, and to store new or revised service logic in the CCP.

As another example, a business or other entity can provision service overlay logic or other enhanced service logic for a subscriber or group of subscribers by employing an embedded service provisioning system. In particular, a set of provisioning logic for provisioning an SCP or other network entity is embedded within a business system that is otherwise unrelated to the provisioning of communications services. For example, a hotel guest-registration system may be arranged to receive information about a guest so as to facilitate check-in at the hotel. The registration system may be configured to further communicate with a network entity so as to provision special communication services for the guest. The registration system may, for instance, automatically call a provisioning subroutine that transmits overlay service logic information or other service logic information to an SCP, so as to provision special services for the guest's mobile station or for a mobile station being loaned or rented to the guest. When executed by the SCP, the logic may then cause the SCP to effect a modification of the subscriber's profile so as to provide the subscriber with a special service overlay associated with the hotel (for instance, to direct unanswered calls to the hotel's voice mail system). In turn, the logic may cause the SCP to effect another modification of the subscriber's profile in response to a designated stimulus such as the date and time that the guest is scheduled to or does check-out of the hotel.

As still another example, enhanced subscriber services such as overlay logic can be provisioned into a central control point or other entity through an Internet connection via the Worldwide Web or the like. For instance (and without limitation), a subscriber station may be arranged as a Wireless Access Protocol ("WAP") client with respect to a WAP server on the Internet. As an example, then, the WAP server may provide for display at the subscriber station a form that the subscriber can fill in, in order to provide various service provisioning data (e.g., desired overlay logic, or other desired logic). The WAP server, the subscriber station, or another entity in the network may then convert the provisioning data into a format suitable for loading onto and application by a central control point for instance, and the formatted data can be loaded onto the central control point, to be subsequently applied for the subscriber. In this way, a subscriber at a WAP-enabled station can provision telecommunications services for the WAP-enabled station. For instance, if a mobile subscriber wants to automatically turn on voice-mail service on a given date and turn off voice-mail service on another given date, the subscriber may provision such service overlay logic through the contemplated WAP-based provisioning arrangement.

As yet another example, service provisioning over the Internet may make use of increasingly well known voice-based browsing techniques such as VXML ("Voice eXtensible Markup Language"). Thus, for instance, a person at a mobile station, landline station or other Internet terminal can provision enhanced service logic by speaking to a VXML server. The server would then convert the spoken words into provisioning data, the server or another entity would translate the data into a format suitable for loading onto and application by a central control point, and the formatted data can be loaded onto the central control point, to be subsequently applied for a subscriber.

Figure 4:
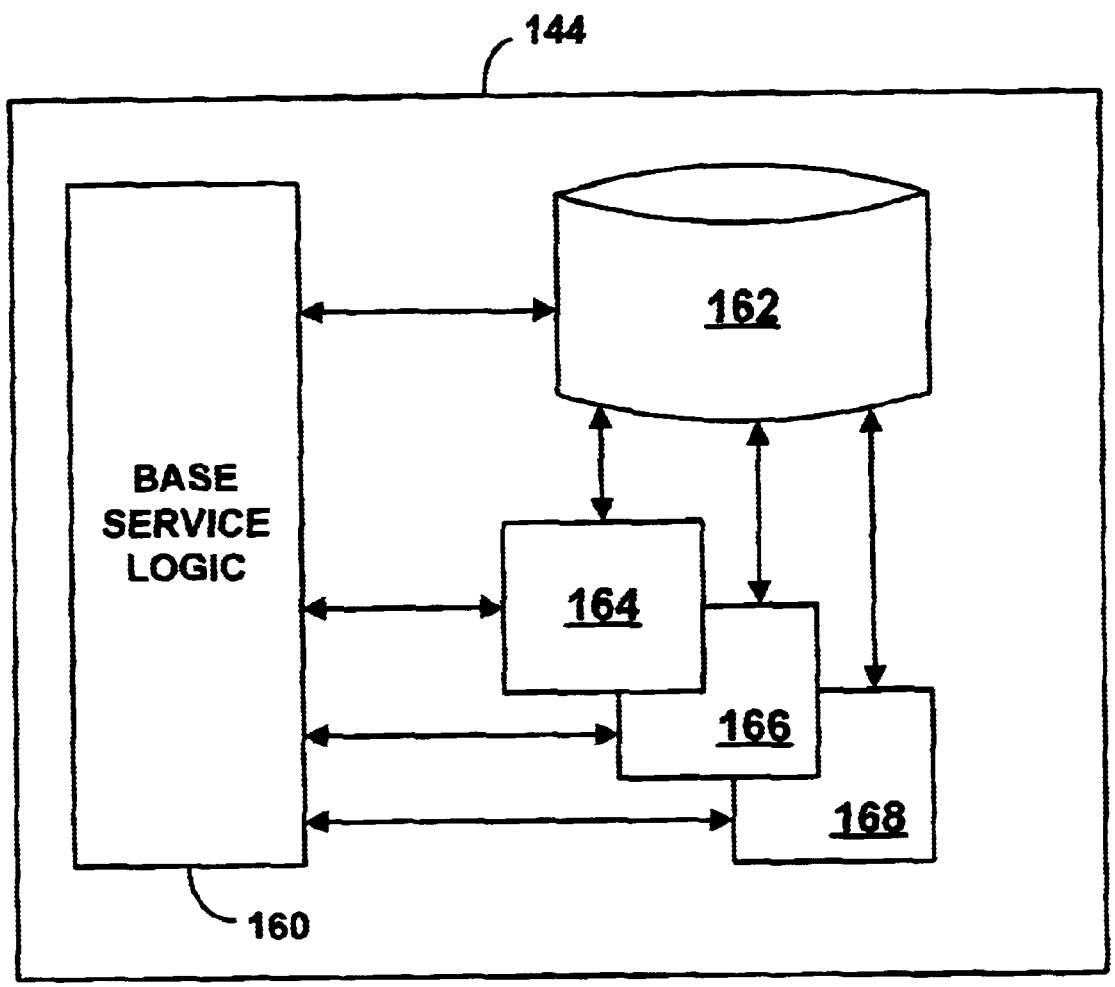
FIG. 4 is a block diagram illustrating a central control point in accordance with an exemplary embodiment of the present invention.

Referring next to FIG. 4, there is shown a block diagram illustrating exemplary SCP 144 in greater detail. In FIG. 4, double-headed arrows indicate the most important logical connections between the components. SCP 144 may be a Telcordia ISCP or may take other forms.

SCP 144 typically includes a number of logic modules, which may be stored in a memory (not shown) and executed by a processor (not shown). Exemplary SCP 144 may include a base service logic module 160. Base service logic module 160 includes functionality for decoding and encoding TCAP messages received from and sent to MSC 118 via STP network 128. Base service logic module 160 also includes service logic for determining what databases and service logic modules to invoke in order to process the information from decoded TCAP messages. For example, base service logic module 160 has access to a subscriber service database 162, which indicates by subscriber or class of subscriber what enhanced services are authorized and active. Subscriber service database 162 may be keyed to an MSID, ESN, MDN, IMSI, other subscriber number, or a particular class of service, for instance, and may identify a service logic module associated with that key.

Typically associated with each enhanced service is a service logic module, which is the software specifying how to provide the service. FIG. 4 illustrates three service logic modules 164, 166, 168 by way of example. Each service logic module is usually able to query subscriber service database 162 directly and to query base service logic 160 as well. To provide a given enhanced service, base service logic module 160 typically invokes the appropriate service logic module as a kind of subroutine call. In particular, base service logic module 160 passes a set of input parameters to the service logic module, and the module returns a set of output parameters out of which base service logic module 160 can encode the TCAP message or messages needed to provide the desired service.

SCP 144 may of course take other forms. As an example, for a given subscriber or group of subscribers, the SCP may maintain a distinct set of call processing logic, which the SCP may employ for calls involving that subscriber or group, rather than (or in addition to) employing base logic module 160 and special service modules 164–168.

As indicated above, an object of the present invention is to provision enhanced services for subscriber 112 in response to a designated stimulus. More particularly, in an exemplary embodiment, an object is to provision enhanced services for subscriber 112 at least in part by modifying the subscriber's service profile to thereby provision the network to provide one or more services for the subscriber. In the exemplary network of FIG. 3, parameters of the subscriber profile for subscriber 112 are maintained in VLR 42 and in HLR 134. The profile parameters maintained in the VLR may be referred to as a VLR profile, and the profile parameters maintained in the HLR may be referred to as the HLR profile. As also noted above, however, the invention is not necessarily restricted to the network arrangement of FIG. 3, but can extend to use in other types of networks and/or across network platforms.

In the existing art, if a business wishes to provide a special set of services for a mobile subscriber, the business would typically contact the customer care department of the subscriber's carrier. The customer care department may then input authorized service logic into a database, and the changes would be converted into the necessary format and stored in the subscriber's HLR profile. To the extent any of the added service logic requires modification of the subscriber's VLR profile, a script programmed in the HLR would then cause the HLR to send a QUALDIR message to the subscriber's serving system, if any, and the serving system would store the updated profile in its VLR for later reference.

One problem with this existing system is that it could take from 20 minutes to more than 12 hours to put such service changes into effect. Therefore, it is inefficient and fails to facilitate dynamic changes to subscriber profiles, i.e., it fails to allow changes to be implemented on demand or in response to predefined stimuli.

In the exemplary embodiment, a central control point in network 110 is programmed with a set of service logic that responds to a stimulus by effecting a modification of the subscriber's profile. The central control point can be any entity or combination of entities, whether or not shown in FIG. 4. Examples include an SCP, an IP (not shown), an SN (not shown), or a private business system such as a PBX/CTI arrangement (not shown) for instance.

For illustration, however, the central control point will be assumed to be SCP 144. Within SCP 144, the service logic that responds to a stimulus and effects a modification of a subscriber profile can then be part of base service logic 160, part of a special service logic module such as module 164 for instance, or any other code module. In the exemplary embodiment, the code executed by SCP 144 is object oriented, event-driven code, so that it can respond to events (such as timer events, for instance) by executing an appropriate set of logic.

The following sections will describe example methods of modifying a subscriber profile, example stimuli that may be used to trigger a modification of a subscriber profile, and example modifications of a subscriber profile. In turn, to help illustrate operation of the invention, several additional examples will be described.

Methods of Modifying a Subscriber Profile

SCP 144 can effect a change of a subscriber profile in the serving system in any suitable fashion. Two exemplary methods will be described. First, the SCP may indirectly effect a change of the subscriber profile by modifying the HLR record for the subscriber, which will cause the HLR to send the changed profile to the serving system. Second, the SCP may directly effect a change of the subscriber profile by sending to the serving system a service qualification message including the modified profile. In either case, the serving system may receive a modified subscriber profile and record it in its VLR for later reference.

Figure 5:
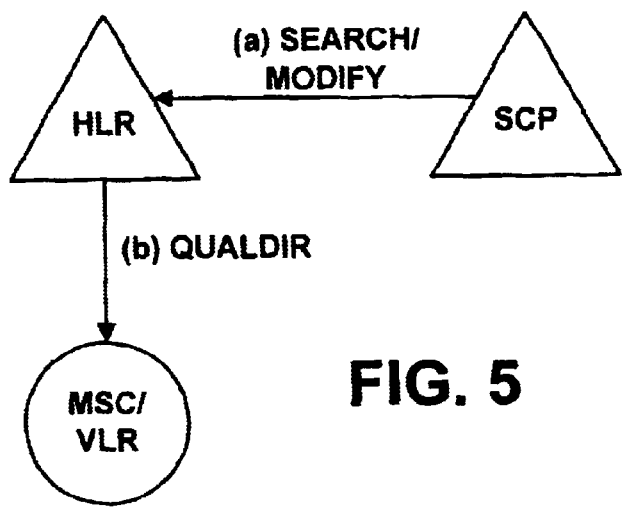
FIGS. 5–7 are block diagrams illustrating operation of exemplary embodiments of the present invention.

The first way for the SCP to modify a subscriber's VLR profile is for it to modify the subscriber's profile in the HLR, which will in turn cause the HLR to send a QUALDIR with the modified profile to the serving system. In this arrangement, the SCP may query the HLR with an IS-41 SEARCH invoke, to determine parameters of the subscriber's current profile. The SCP may then direct the HLR to modify desired profile parameters, using an IS-41 MODIFY invoke. In turn, because the HLR profile for the subscriber has been modified, the HLR would automatically send a service qualification message to subscriber's serving system, providing a refreshed VLR profile that contains the parameters as modified by the SCP. This method of effecting a profile modification is illustrated in FIG. 5, where, in step (a), the SCP sends SEARCH and MODIFY invokes to the HLR and, in step (b), the HLR sends a QUALDIR invoke to the MSC/VLR.

The second way for the SCP to modify a subscriber's VLR profile is for it to send a service qualification message to the serving system. In the exemplary embodiment, this may involve either of at least two arrangements (by way of example): (i) generating and sending to the serving system a QUALDIR message that contains the desired profile parameters, or (ii) receiving a service qualification message for the subscriber from another network entity (e.g., the HLR or a call agent, for instance), modifying the service qualification message to contain the desired profile parameters, and sending the modified message to the serving system.

Figure 6:
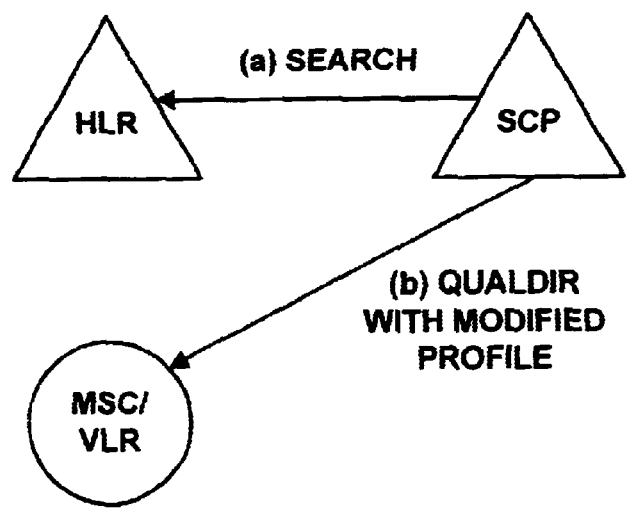

In one exemplary arrangement, the SCP can directly modify a subscriber's VLR profile by sending a QUALDIR invoke message to the serving system, and thereby providing the serving system with a desired modified profile. Assuming that the SCP does not already know what the subscriber's profile contains, the SCP may first send a SEARCH invoke message to the HLR, requesting the subscriber's profile. The HLR would respond with the requested profile information. The SCP may then modify parameters of the profile in accordance with a desired service-overlay (i.e., to add, delete or otherwise change triggers or other parameters to facilitate a desired set of services) and then itself send a QUALDIR to the serving system, providing the modified profile for storage in the VLR. Of course, intervening elements may be present as well. Further, to the extent possible, the SCP might instead send only one or more parameters to the serving system, in order to modify just a part of the subscriber profile without sending an entire modified profile to the serving system. This arrangement is illustrated in FIG. 6, where, in step (a), the SCP sends a SEARCH invoke to the HLR, and, in step (b), the SCP sends to the MSC/VLR a QUALDIR invoke carrying modified profile parameters.

Figure 7:
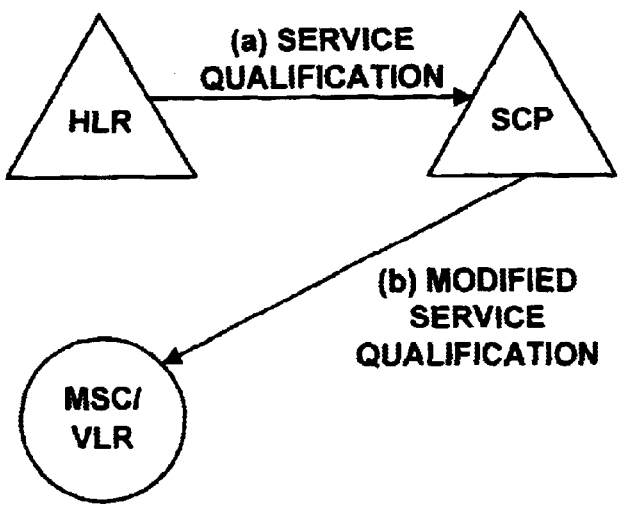

In another exemplary arrangement, the SCP can directly modify the subscriber's VLR profile by intercepting a service qualification message that is purportedly being sent to the serving system, and then modifying the profile carried by the service qualification message and forwarding the modified service qualification message to the serving system. The service qualification message may be a QUALDIR invoke, a regnot response, a qualreq response or any other message now known or later developed. This arrangement is illustrated in FIG. 7, where, in step (a), the HLR sends a service qualification message that is received by the SCP and, in step (b), the SCP sends a modified service qualification message to the MSC/VLR.

This interception of service qualification messages can be achieved by interjecting the SCP as a "message mediator" between the HLR and the serving system. The idea here is to make the SCP look like the HLR in the serving system's eyes and/or make the SCP look like the serving system in the HLR's eyes. In the exemplary embodiment, this is achieved by causing messages that the serving system would normally send to the HLR to be directed to the SCP instead, and causing messages that the HLR would normally send to the serving system to be directed to the SCP instead.

As presently contemplated, the serving system (e.g., MSC 118) may be data-filled or otherwise programmed to send particular types of invoke messages to the SCP that the serving system would normally send to the HLR instead. Such invoke messages would normally identify the serving system by an MSCID parameter, which includes the point code of the MSC that is sending the message. When the SCP receives such an invoke message, the SCP will execute a set of programmed logic to change the MSCID in the message to be an MSCID that points to the SCP instead of the serving system, and the SCP will then forward the modified message to the HLR. The SCP will further maintain a record of the true MSCID for later reference. When the HLR receives the message, it will believe the message to be an invoke from a serving system whose MSCID is in reality that of the SCP. Consequently, the HLR will respond to the message by returning a response message to the SCP rather than directly to the serving system.

In general, most switches can be programmed to send certain types of messages to designated point codes in the network. To program a switch to do so may simply require data filling an appropriate translation table in the switch, to tell the switch to send a certain type of message to a designated point code, perhaps restricting this translation to apply for only a specified subscriber or group of subscribers. In a Lucent MSC, for instance, the data table may be a "NetNeighbor" table. Using this or any other suitable process, MSC 18 can be programmed to send all REGNOT, QUALREQ, LOCREQ and/or other invoke messages to SCP 144 for instance, rather than conventionally to HLR 134, to facilitate the desired message mediation finction.

As an example, consider the process that takes place when subscriber 112 is first detected in serving system 138. At that moment, serving system 138 would normally send a REGNOT message to the HLR 134. In the exemplary embodiment, however, serving system 18 will instead send a REGNOT message to SCP 144. Upon receipt of the REGNOT message, SCP 144 will change the MSCID in the REGNOT message to point to the SCP, maintaining a record of the true MSCID in the subscriber's record in database 162 for later reference. SCP 144 may also make preparations to receive subscriber 112's service profile from HLR 134, such as calling a subroutine that will await receipt of a service qualification message from HLR. SCP 144 will then forward the modified REGNOT message to the HLR.

In response to the REGNOT message, the HLR will generate a regnot response message containing the subscriber's service profile and, thinking that it is sending the message to the serving system, will send the message to the SCP pursuant to the MSCID. In addition, in response to the REGNOT message, the HLR will record the MSCID of the serving system in which subscriber 112 is currently located (so as to direct calls to the subscriber), but, in so doing, will in reality be recording the MSCID that points to SCP 144.

When the SCP receives the regnot response, it may employ service logic for the subscriber to make any desired change to the profile contained in the message (or to any other part of the message for that matter). For example, it may add or modify a desired trigger or trigger address. The SCP will then forward the modified regnot response to MSC 118 in the actual serving system, which will store the modified profile in the VLR for later reference.

Note that a similar technique would apply for a QUALREQ message that serving system 118 sends to HLR 134. Rather than sending the message to the HLR, the message would go to SCP 144. SCP 144 would change the MSCID and send it to the HLR, and HLR would return a qualreq response to SCP 144. SCP 144 may then modify the profile in the response and forward the modified qualreq to the serving system.

As a related point, if serving system 138 receives a request to terminate a call to remote mobile station 26 (in serving system 140), serving system 138 would normally send a LOCREQ to HLR 134. By employing the present message mediation technique, serving system can send the LOCREQ to SCP 144 instead, which can be used in place of a termination trigger at MSC 118. Just like a termination trigger, SCP 144 can then return call handling instructions to MSC 118 in a locreq response (whether or not first forwarding the LOCREQ to HLR 134 and obtaining a locreq response from HLR 134).

With this arrangement, since HLR 134 believes that subscriber 112 is currently being served by a serving system with an MSCID that actually points to SCP 144, any service qualification messages sent from HLR 134 to that serving system will go to the SCP instead. Thus, whenever HLR 134 sends a QUALDIR message to serving system 138, SCP 144 will receive the message and can modify the profile as desired before forwarding the message to the serving system.

By sitting in between the serving system and the HLR, the SCP may thus monitor and act on (e.g., modify) communications between those elements. The SCP can therefore ensure (or at least help to ensure) that whenever a subscriber's VLR profile gets updated, for whatever reason, the profile gets updated with the profile that the SCP wants the serving system to have (e.g., an overlay profile). Advantageously, the VLR profile parameters can thus be made to differ from the corresponding parameters maintained in the subscriber profile at the HLR.

With the above arrangements, the present invention may impose a desired modification on the VLR profile for a subscriber, by adding, removing or revising one or more parameters of the profile. However, this desired modification may be lost if the VLR profile reverts back to its original state or is otherwise updated without regard to modifications that were made. Since the HLR generally remains active in mobility management and base features and functions, the HLR might refresh the VLR at some point. In that event, if the HLR was not itself updated to reflect the desired modifications of the subscriber profile, this would effectively erase the modifications made to the VLR profile. To avoid this problem, an exemplary embodiment of the invention provides a mechanism to help ensure that the VLR profile maintains the desired set of service parameters when the VLR gets updated.

As indicated, a VLR service profile for a subscriber may be updated by the HLR in response to particular events, such as registration, expiration of a previous service qualification, or changes to the HLR record for the subscriber. In response to a REGNOT message, for example, the HLR will send a regnot message to the serving system, which includes an updated profile. As another example, if an HLR receives an indication that a text or voice message is waiting to be sent or picked up by a mobile subscriber, the HLR will update the service profile for the mobile station and will automatically send a QUALDIR message to the serving system to notify the serving system that a message is waiting.

In accordance with an exemplary embodiment, SCP 144 may effectively detect such updates or modifications to the VLR profile and then responsively modify the profile to include the desired set of service parameters.

One way for the SCP to detect modifications to the profile is to employ the message-mediation arrangement described above. In particular, by inserting the SCP in between the HLR and the serving system and making the HLR send any service qualification messages "through" the SCP, the SCP will know that an update to the VLR profile is occurring. The SCP may then be programmed with service logic that responsively modifies the subscriber profile carried by the service qualification message, to impose any desired set of service parameters on the profile.

Another way for the SCP to detect modifications to the profile is to cause the serving system to tell the SCP when an update occurs. To achieve this function, in an exemplary embodiment, MSC 118 can be programmed to send a REGNOT to SCP 144 once MSC 118 receives a successful regnot message (or other such messages) from HLR 134. In this arrangement, when the SCP receives a REGNOT from the serving system, programmed logic in the SCP can then generate and send to the serving system a modified profile, in a QUALDIR message as described above for instance.

Still another way for the SCP to detect modifications to the profile is to cause the HLR to tell the SCP whenever modifications occur. To achieve this, a script (service logic) can be written into the HLR that will cause the HLR to generate and send a message to the SCP when any (or one or more particular) changes have been made to a given profile. At least in part by receiving this message, the SCP can detect that the subscriber profile has been modified.

As an example, the HLR can be programmed to send a MODIFY message to the SCP when the HLR modifies a subscriber profile, such as in response to a REGNOT message. The SCP can in turn be programmed to recognize that a MODIFY message from the HLR means that a subscriber profile has been modified. Alternatively, the entities can be programmed to use another agreed message for this purpose. For instance, industry protocols define a "Service Request" message whose parameters can be user-defined. The HLR may thus be programmed to send a Service Request message to the HLR, providing a parameter that the SCP is in turn programmed to understand as an indication that the subscriber profile in the HLR has been changed in some way. In turn, if the SCP needs to ensure that the profile remains modified to include one or more desired parameters, the SCP can then itself modify the subscriber profile by employing the methods described above.

In an exemplary embodiment, it would be best to include within a subscriber's profile an all-digits trigger that allows SCP 144 to know when the subscriber sends a feature code to the HLR. That way, the SCP can know when the subscriber activates or de-activates a feature while a service overlay is in effect. The SCP can record the feature code in a database record for the subscriber and then forward the feature code to the HLR. In turn, if and when the SCP modifies the subscriber profile back to its original state, the SCP can be sure to include within the profile any such changes made while the overlay was in effect.

Stimuli that May Give Rise to Modification of a Subscriber Profile

In accordance with an exemplary embodiment, any suitable stimulus can be used as a basis to effect a modification of a subscriber profile. Examples of stimuli include, without limitation, (i) a time, day or date event (a "time-based stimulus"), (ii) a change of subscriber location (a "location-based stimulus"), (iii) a designated threshold (a "threshold-based stimulus"), (iv) call processing activity ("call-processing-based stimulus"), or any combination of these or other events.

As an example, the stimulus could be a time, day or date event. For instance, SCP may be programmed to effect a modification of a subscriber profile on a specified date or at the expiration of a specified time. The SCP may thus be programmed to activate and perhaps deactivate a service overlay for a subscriber or group of subscribers at set times, which could be arranged to coincide with other events. In one arrangement, these other events might be the times that a subscriber starts and stops using a business service. For instance, when a guest checks in at a hotel, the hotel could automatically provision the SCP to (i) impose a service overlay for the guest's communication service and (ii) remove the service overlay at check-out time on the date the guest is scheduled to check out of the hotel.

As another example, the stimulus could be a change of location of the subscriber. For instance, the SCP may be programmed to effect a service profile change when the subscriber enters a particular zone (defined with any desired level of granularity) and be de-activated when the subscriber leaves the particular zone. The zone may be a serving system, a business property, such as all or part of a building, a park, an entertainment attraction, or the like, or any other contiguous or noncontiguous geographic area. The zone may be otherwise associated with a business customer, so that the business customer can provide the service overlay to subscribers within the business zone, triggered for instance by a subscriber's entry into the business zone or registration with the business. Various position determining mechanisms are well known in the art and can be implemented to inform the SCP when a subscriber changes zones, to facilitate a service overlay in accordance with the present invention.

As still another example, the stimulus could be a threshold. The threshold could take any suitable form. For instance, a business may want to provide a subscriber with pre-paid communication service that allows the subscriber to place a set number of outgoing local calls (and/or to receive a set number of incoming calls). To accomplish this, the business may provision an SCP to modify the subscriber's profile to include a trigger that causes the serving system to send a TCAP query to the SCP in response to all origination attempts (for example). The SCP may then be programmed with logic that tracks the number of calls made by the subscriber (recording the number of calls in a subscriber record in database 162, for instance). In a possible arrangement, the programmed logic may dictate that, until the threshold is met, the SCP should instruct the serving system to connect the requested call to the dialed number and to bill the business rather than the subscriber. Once the threshold is met, the logic may then dictate that the SCP should modify the subscriber's profile to put it back in its original state, so that the subscriber, rather than the business, is charged for any subsequent calls beyond the designated threshold.

Still further, the SCP may be programmed to direct the serving system to route all outgoing or incoming calls for a subscriber to a designated service node, which may play an advertisement for the business and then direct the serving system to connect the call to its destination. Such advertisements can offset the cost of providing a pre-paid service.

As yet another example, the stimulus could be some predefined type of call processing activity or other occurrence in connection with network 110 or in connection with another network. For instance, the stimulus could be that the subscriber places a call to a designated long distance number. In response to that stimulus, the SCP might then effect a desired modification of the subscriber's profile. As another example, activity in one network might serve as a stimulus to give rise to a subscriber profile change in another network. For instance (and without limitation), referring back to FIG. 2, if SCP 48 learns that subscriber station 56 is currently located in the service area of serving system 36, SCP 48 might treat this as a stimulus an responsively effect a change of the subscriber's profile in landline serving system 32, to thereby cause unanswered calls to the subscriber's landline telephone (e.g., station 40) to be forwarded to the subscriber's mobile station 56.

Of course, other stimuli are possible as well. For instance, the stimulus might involve a subscriber sending a customized profile management code, the SCP detecting the customized profile management code as a request to modify the subscriber's profile, and the SCP then responsively effecting a modification of the profile. Such logic for the subscriber could be programmed into the SCP to toggle the service overlay on and off in response to a predefined dialed digit sequence, or to turn on the overlay in response to one code and turn off the overlay in response to another code, for instance. Such customized profile management code logic is described in a U.S. patent application entitled "System for Managing Telecommunications Services Through Use of Customized Profile Management Codes," filed by Dorene G. Weiland et al. on the same date as the present application, and assigned to the owner of the present invention, the entirety of which is hereby incorporated herein by reference.

As noted above, the modification of a subscriber profile can be temporary. An SCP can be programmed to modify a profile in response to one designated stimulus and then modify the profile back to its original state in response to another designated stimulus. Thus, the SCP can effectively provide a service overlay for a subscriber for a set period of time, while the subscriber is in a particular location, or according to other such restrictions.

Example Modifications of a Subscriber Profile

In accordance with an exemplary embodiment, once SCP 144 detects the designated stimulus (using any means), the SCP will effect a modification of the service profile for subscriber 112 in serving system 138, by employing the methods described above, for instance. This modification of the service profile may take any form. However, an exemplary modification comprises adding or modifying one or more triggers or trigger-addresses (collectively or separately referred to as a "trigger") in the profile, so that the serving system is caused to send a message to or otherwise communicate with a designated network entity in response to a call processing event (such as origination or termination) or other occurrence.

The designated network entity with which the serving system is directed to communicate pursuant to the added/modified trigger can be any entity. Examples of such entities include an SCP, an IP, a SN, and various private systems such as an interactive voice response ("IVR") system, a PBX server, and a combination PBX/HLR server, for instance.

In the exemplary embodiment, the designated entity is arranged to carry out a set of service logic associated with the subscriber in response to a message sent pursuant to a trigger. For example, the entity could be an SCP programmed to provide special services for the individual subscriber or for a group of subscribers in response to an origination request associated with the subscriber or group of subscribers. This SCP could be the same entity that effects the modification of the subscriber profile, or it could be a different entity. As another example, the entity could be a private service node that will provide enhanced services for the subscriber and others. The private service node may, for instance, be operated by or otherwise associated with a business (such as a hotel), so as to provide special communications services for customers of the business (such as hotel guests). For instance, the service node might provide custom announcements or PBX services.

As a general example of modifying a service profile, assume that the service profile for a subscriber normally includes one or more trigger-addresses that direct the serving system to query the HLR in response to a call processing event. The SCP may modify these trigger-addresses so as to instead direct the serving system to query the SCP in response to an origination or termination attempt. When call processing control is passed to the SCP, the SCP can then apply any programmed set of service logic for the subscriber, which may be different than the services that would be provided to the subscriber by the HLR or pursuant to the subscriber's existing profile.

For instance, in typical operation as noted above, a subscriber may activate or de-activate a particular service by sending a feature code, which the serving system would normally forward to the HLR so as to update the subscriber's profile. In an exemplary embodiment of the present invention, the SCP can modify the subscriber profile to add to the subscriber profile an all-digits trigger that points to the SCP. Such a trigger would cause the serving system to respond to any dialed digits, even a feature code, by sending a TCAP query to the SCP. The TCAP query would convey to the SCP an identification of the subscriber (e.g., MSID, ESN or other subscriber number) as well as the digits dialed by the subscriber. SCP base logic 160 would responsively call up the subscriber record from database 162, which may point to a specified service logic module 166. Module 166 may then examine the feature code and take appropriate action. For instance, module 166 may implement a special version of the requested service, rather than the version of the requested service that the HLR would have implemented.

As a more particular example, assume that a subscriber has a voice mail service, which the subscriber normally turns on and off by dialing a standard feature code and pressing SEND on the mobile station. The serving system would responsively send that feature code to the HLR, which would cause the HLR to record in the subscriber profile that unanswered calls should be forwarded to the service provider's standard voice message system. In turn, when an unanswered call arrives for the subscriber, the serving system might encounter a termination trigger, which would cause the serving system to query the HLR for routing instructions, and the HLR would direct the serving system to route the call to the standard voice message system. Alternatively, the HLR could be arranged to forward the feature code to an SCP, and the SCP would then responsively apply a specified set of logic.

As presently contemplated, the SCP may implement a service overlay for the subscriber that responds to such a feature code by instead causing unanswered calls to the subscriber to be redirected to a special voice message system, which may be associated (e.g., as part of a PBX system) with a business providing the overlay service, for example. To do so, the SCP may add to the subscriber's profile an all-digits trigger pointing to the SCP, as well as a termination trigger for unanswered calls also pointing to the SCP.

When the subscriber sends the feature code to turn on voice mail, the serving system would then send the feature code to the SCP in a TCAP query. Upon receipt of the feature code, a record for the subscriber in SCP database 162 may then be changed to reflect that unanswered calls to the subscriber should be routed to the special voice message system. Such code might be programmed into logic module 164 for instance.

In turn, when a call arrives for the subscriber and is unanswered, the serving system would send a TCAP query to the SCP. The SCP may then instruct the serving system in a TCAP response to route the call to the special voice message system, such as an IP and/or an IVRU. In an exemplary embodiment, the special voice message may then answer with an outgoing message such as "Thank you for calling business XYZ; please leave a message for person A."

Although a preferred modification of the service profile is to add or modify one or more triggers to cause the serving system to communicate with another network entity (such as SCP 144), the modification can take other forms as well. For example, as noted above, the service profile may include parameters that identify a subscriber's PIN and call processing trigger points at which the serving system must require input of the PIN before allowing call origination attempts from the mobile station. A subscriber's existing profile might not include these parameters. However, as a type of service overlay, an SCP can modify the profile to include the parameters and can even specify the PIN that the subscriber must enter. This service overlay can be used for security purposes, such as to prevent the use of a rented mobile station after a particular period of time, or for other purposes.

Additional Examples of Operation
(1) Temporarily Transferring Billing to a Third Party Assume that a guest arrives at Hotel ABC for a convention and seeks to register with the hotel for a three day stay. Upon greeting the guest, a hotel clerk enters the guest's name and address into a computerized hotel registration system. Noticing that the guest has a mobile phone, the clerk asks whether the guest would like to be provisioned to have outgoing calls billed on the subscriber's hotel invoice. (This may be useful for business travelers who need to request reimbursement for mobile phone calls as well as lodging). With the guest's approval, the clerk scans a code on the back of the guest's mobile phone or otherwise enters into the hotel registration system information that identifies the guest's phone, such as the MSID and ESN. Alternatively, the clerk might obtain the necessary information in other ways, such as through written authorization and manual data entry, for instance. When the clerk presses "ENTER" at the hotel registration terminal, the guest is registered for his three-day stay at the hotel, and the process of automatically provisioning and implementing a service-overlay for the guest begins.

Through a software call to an embedded provisioning routine, the hotel registration system automatically generates and transmits a set of provisioning data over an IP network such as the Internet to an SMS. The SMS validates the data, converts the provisioning data to a protocol necessary for loading into SCP 144, and loads the data into SCP 144. The data is stored on a data storage medium at SCP 144 as service logic module 164, and the subscriber record in database 162 is updated to reflect that the subscriber has a service-overlay defined by module 164. In this example, the logic indicates that the subscriber's VLR profile should be immediately modified (i) to add an all-digits origination trigger that will cause the serving system to query SCP 144 for call processing instructions and (ii) to change the DMH_BillingDigits parameter or other billing parameter so as to specify that the hotel should be billed for calls placed by the subscriber. In addition, the logic further indicates that the VLR profile should be changed back to its original state at the check-out time of 11:00 a.m. in three days.

Executing these instructions, SCP 144 queries HLR 134 with a SEARCH command to learn what origination triggers and billing digits are included in the subscriber's existing profile. The search response from HLR 134 indicates that the subscriber profile currently includes an all-digits trigger pointing to an SCP in the subscriber's home system, rather than to SCP 144, and the profile does not include special billing digits. SCP 144 records this information in a field of the subscriber's record in database 162 for later reference. SCP 144 then generates and sends a MODIFY command to the HLR, instructing the HLR to modify the all-digits trigger address to point to SCP 144, and to specify that calls should be billed to a designated telephone number associated with the hotel. In response to this modification, the HLR then sends an updated profile to the subscriber's serving system, thereby imposing the desired changes. Alternatively, the SCP can be programmed to populate the DMH_BillingDigits parameter or other specified parameter in the subscriber's profile on a call-by-call basis, e.g., with a QUALDIR message.

In turn, the subscriber seeks to place a call with his mobile phone. In response to dialed digits, the serving system encounters the all-digits trigger pointing to SCP 144. Therefore, the serving system sends a TCAP query to SCP 144, identifying the subscriber and the dialed digits. SCP 144 then executes a set of service logic for the subscriber (e.g., for any guest at the hotel), which causes SCP 144 to instruct the serving system to route the call to a private service node (e.g., an IVRU). The serving system then sets up and connects the call to the service node. Next, the service node optionally plays an announcement to the subscriber indicating that the call will be billed to the subscriber's hotel account. In turn, the service node sets up the call through the serving system to the destination dialed by the subscriber. This way, the service node remains in the path of the call and can monitor the duration of the call. When the subscriber hangs up, the service node can enter a record of the call, and the call can be billed to the subscriber's hotel account.

Alternatively, the service logic executed by the SCP could be arranged to respond to such an origination request TCAP message by generating and sending to the hotel's PBX or Centrex system a Specialized Message Detail Record ("SMDR"), which can provide a record of the call to the hotel's system, to thereby allow the hotel to bill for the call.

At 11:00 a.m. three days later, the service logic resident on SCP 144 detects that a time-based stimulus is satisfied and that the subscriber's profile should be modified back to its original state. Consequently, the SCP sends a MODIFY command to the HLR, instructing the HLR to eliminate the added origination trigger and third party billing criteria. Finally, the HLR then sends a QUALDIR message to the serving system, imposing the modification to revert the profile back to its original state.

(2) Re-routing Incoming Calls for a Set Period

Assume that a movie theater operator wants to modify the service profiles of mobile subscribers while the subscribers attend a movie. In response to detection of a mobile station in the theater (as indicated by the subscriber telling the theater, or through use of position determining equipment or any other mechanism), a computer system may send a service provisioning request to an SCP, instructing the SCP to modify such profiles so as to include a special termination trigger and/or trigger-address that will cause the serving system to query an SCP for call processing instructions.

The SCP may in turn be provisioned for the duration of the movie to instruct the serving system to redirect the incoming calls for such subscribers to a special message center (e.g., a service node with interactive voice response unit ("IVRU")) that is associated with the theater. If a call arrives for a subscriber during the movie, then, rather than ringing the subscriber's phone, the call would thus be redirected to a message center. At the conclusion of the movie, the message center may then be programmed to forward the message to the subscriber, or the movie theater may otherwise convey the message to the subscriber. Further, at the conclusion of the movie, the subscriber's profile can be returned to its original state so that the subscriber can receive calls as normal.

(3) Sending Text/voice Messages in Response to Call Processing Activity

In response to a designated stimulus such as a change of subscriber zone (e.g., entry into a particular business zone) or specified time, the SCP may modify a subscriber's profile to include in the profile an all-digits trigger pointing to the SCP. In addition, the SCP may be provisioned to respond to an origination request TCAP message for the subscriber by sending a text or voice message to the subscriber or another entity, providing any specified information.

Thereafter, when the subscriber places a call, the serving system would encounter the trigger point and would send a TCAP message to the SCP. The SCP would then employ service logic for the subscriber to send a specified text or voice message (for instance, a short message service message, an SMTP (e.g., e-mail) message, a voice mail message, etc.) For instance, the SCP may send a message to a designated entity stating that the subscriber just placed a call to the destination indicated in the TCAP message. The message may include information that the SCP gleans from the TCAP query message and/or information maintained by the SCP or by external reference databases. For instance, rather than indicating the called number in a message, the SCP can consult an external database to determine the name of a person associated with the called number and may insert in the message an indication that the subscriber called that person.

Subsequently, in response to another designated stimulus, the SCP may modify the subscriber profile to put it back into its original state. Further, the SCP may modify its record for the subscriber to avoid sending text or voice messages in response to a subsequent TCAP origination request associated with the subscriber.

(4) Overlaying a Service Associated With a Business Service

As another example, an entertainment business such as an amusement park could arrange to activate a service-overlay for a subscriber when the subscriber provides an admission token such as a ticket with a bar code or other indicia identifying the subscriber's mobile station, and the business could de-activate the service overlay at a set period of time or when the subscriber leaves the business premises.

More particularly, when a subscriber purchases an admission ticket for an entertainment business, the ticket may be bar coded with the subscriber's MSID. When the subscriber enters the business premises, the admission ticket may be scanned. In addition to allowing the subscriber to enter the business premises, the admission system may automatically send provisioning data to an SCP, which directs the SCP to apply a predefined set of logic for the subscriber. The predefined set of logic causes the SCP to modify the subscriber's profile to add a special service associated with the business. Further, the predefined set of logic could cause the SCP to modify the subscriber's profile back to its original state at the end of the business day.

(5) Other Examples

Assorted other applications of the present invention are possible. Merely as examples, the invention might be applied to:

Offer simultaneous ringing on a landline telephone for a subscriber while the subscriber is in a specified zone, such as in a hotel building;

Apply the PBX/Centrex features of a business (e.g., abbreviated dialing, conference bridging, call transfer, concierge service, etc.) while the subscriber is in a given location (e.g., the business premises) or for a set period of time;

Offer broadband service, such as video communications, to the subscriber for a set period of time;

Provide a subscriber with notification on a mobile station display, indicating that the subscriber has voice mail; or Test market new telecommunications services, by temporarily overlaying the services on particular subscribers' profiles.

Exemplary embodiments of the present invention have been illustrated and described. It will be understood, however, that changes and modifications may be made to the invention without deviating from the spirit and scope of the invention, as defined by the following claims. For instance, as noted above, the invention can be implemented in various types of network arrangements (e.g., landline, wireless, next generation, etc.), and/or across network platforms. As another example, activity in relation to one subscriber might give rise to a change in subscriber profile for another subscriber.

We claim:

1. In a telecommunications network comprising at least one network entity maintaining a set of parameters defining a service profile for at least one subscriber, a method of imposing at least one desired parameter on the service profile comprising:

detecting a modification of the service profile; and in response to detecting the modification of the service profile, performing another modification of the service profile to cause the service profile to include the at least one desired parameter, wherein the at least one desired parameter comprises a trigger arranged to cause a query to be sent to a central control point, and a set of service logic employed by the central control point to carry out a desired function, and wherein the central control point is selected from the group consisting of an SCP, an HLR, a CTI, an application server, and a MIP home agent.

2. A method as claimed in claim 1, wherein the at least one network entity comprises an HLR.

3. A method as claimed in claim 2, further comprising the HLR generating a message in response to a modification of the service profile, wherein the step of detecting the modification of the service profile comprises receiving the message.

4. In a telecommunications network comprising at least one network entity maintaining a set of parameters defining a service profile for at least one subscriber, a method of imposing at least one desired parameter on the service profile comprising:

detecting a modification of the service profile; and in response to detecting the modification of the service profile, performing another modification of the service profile to cause the service profile to include the at least one desired parameter, wherein performing another modification of the service profile to cause the service profile to include the at least one desired parameter comprises modifying the parameters maintained by the HLR, so as to effect a change in the service profile to include the at least one desired parameter.

5. A method as claimed in claim 4, comprising an SCP carrying out the steps of detecting the modification and responsively performing the other modification.

6. A method as claimed in claim 4, wherein detecting a modification of the service profile comprises receiving a service qualification message including the service profile.

7. A method as claimed in claim 4, wherein performing another modification of the service profile to cause the service profile to include the at least one desired parameter comprises:

sending a message to the at least one network entity instructing the at least one network entity to modify the service profile.

8. A method as claimed in claim 4, further comprising performing the other modification in response to at least one designated stimulus.

9. A method as claimed in claim 8, wherein said at least one designated stimulus is selected from the group consisting of a time-based event and a threshold-based event.

10. In a telecommunications network comprising a first entity maintaining a first set of subscriber-information, and a second entity maintaining a second set of subscriber-information, wherein, in response to a change in the first set of subscriber-information the first entity sends to the second entity a message including a subscriber profile, which causes the second entity to update the second set of subscriber-information according to the subscriber profile, a system comprising, in combination:

a third entity arranged to (i) receive the message sent by the first entity, (ii) modify the subscriber Profile so as to create a modified message including a modified subscriber profile, and (iii) send the modified message to the second entity so as to cause the second entity to update the second set of subscriber-information with the modified subscriber profile, whereby the third entity may ensure that the second set of subscriber-information bears one or more specified parameters, so as to impose a specified service profile for one or more subscribers, wherein the first set of subscriber-information defines service features authorized for a subscriber;

wherein the second entity is associated with a given serving system; and wherein the second set of subscriber-information defines service features for the subscriber When the subscriber is registered to be served by the serving system.

11. A system as claimed in claim 10, wherein the first entity comprises a home location register (HLR), and the second entity comprises a visitor location register (VLR).

12. A system as claimed in claim 10, wherein the subscriber comprises a mobile station.

13. A system as claimed in claim 10, wherein the third entity is selected from the group consisting of a service control point (SCP), an intelligent peripheral (IP) and a service node (SN).

14. A system as claimed in claim 10, wherein the message is selected from the group consisting of a Qualification Directive message and a Registration Notification response message.

15. In a telecommunications network comprising a first entity maintaining a first set of subscriber-information, and a second entity maintaining a second set of subscriber-information, wherein, in response to a change in the first set of subscriber-information the first entity sends to the second entity a message including a subscriber profile, which causes the second entity to update the second set of subscriber-information according to the subscriber profile, a method comprising providing a third entity arranged to perform the following steps:

receiving the message sent by the first entity before the message is delivered to the second entity;

modifying the subscriber profile so as to create a modified message including a modified subscriber profile; and sending the modified message to the second entity so as to cause the second entity to update the second set of subscriber-information according to the modified subscriber profile wherein the third entity is selected from the group consisting of a service control point (SCP), an intelligent peripheral (IP) and a service node (SN), and wherein the first entity comprises a home location register (HLR) and the second entity comprises a visitor location register (VLR).

16. In a telecommunications network comprising a first entity maintaining a first set of subscriber-information, and a second entity maintaining a second set of subscriber-information, wherein, in response to a change in the first set of subscriber-information the first entity sends to the second entity a message including a subscriber profile, which causes the second entity to update the second set of subscriber-information according to the subscriber profile, a method comprising providing a third entity arranged to perform the following steps:

receiving the message sent by the first entity before the message is delivered to the second entity;

modifying the subscriber profile so as to create a modified message including a modified subscriber profile; and sending the modified message to the second entity so as to cause the second entity to update the second set of subscriber-information according to the modified subscriber profile wherein the third entity is selected from the group consisting of a service control point (SCP), an intelligent peripheral (IP) and a service node (SN), and wherein the subscriber comprises a mobile station currently registered to be served by a serving system associated with a visitor location register (VLR).

17. In a wireless communications network comprising a home register maintaining a profile for a mobile station, and a serving system maintaining a profile for the mobile station when the mobile station is located within a service area associated with the serving system, the home register providing the serving system with a profile for the mobile station in response to a change in the profile maintained by the home register, a system for imposing in the serving system a designated service set for the mobile station, the system comprising:

a message mediator arranged to monitor and modify information delivered between the home register and the serving system, the message mediator comprising a data storage medium, a processor, and a first set of logic stored in the data storage medium and executable by the processor to (a) detect a message sent by the home register, the message defining a Profile for the mobile station, (b) modify the profile so as to generate a modified message defining a modified profile comprising the designated service set for the mobile station, and (c) forward the modified message to the serving system, whereby the serving system may receive the modified profile for the mobile station and responsively maintain and employ the modified profile comprising the designated service set for the mobile station;

a second set of logic stored in a data storage medium and employed by the serving system to cause the serving system to send a registration notification message to the message mediator when the serving system detects the mobile station in the serving area;

a third set of logic stored in a data storage medium and executable by the processor to (i) modify the registration notification message so as to indicate that the message mediator is a switch in the serving system and (ii) forward the modified registration notification message to the home register, the home register responsively sending to the message mediator a registration notification response message including the profile for the mobile station; and said message mediator applying said first set of logic so as to detect said registration notification response message and to modify the profile for the mobile station and forward the modified registration notification response message to the serving system.

* * * * *